INVENTORS
ALVIN P. MULLERY
RALPH F. SCHAUER
BY
ATTORNEY

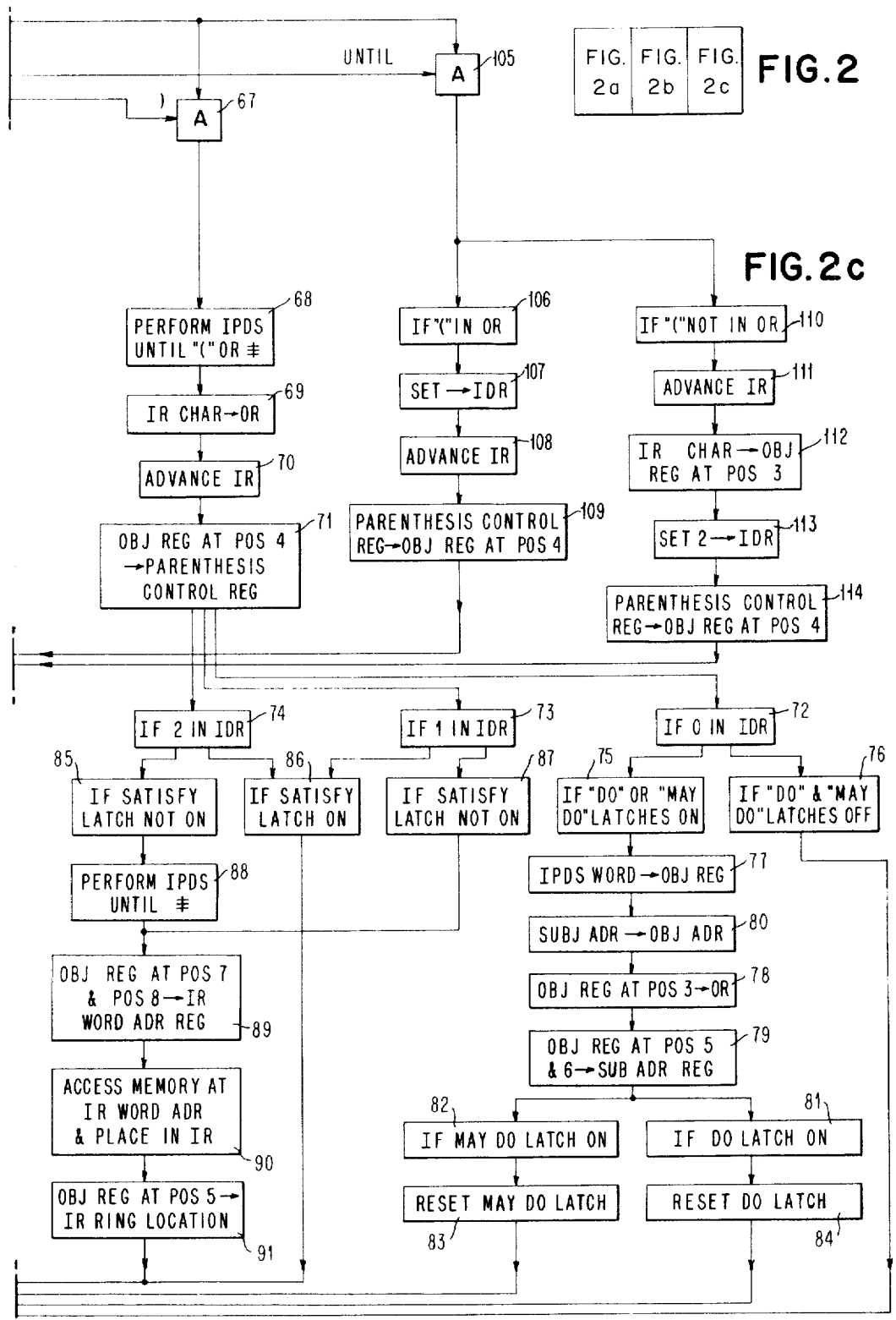

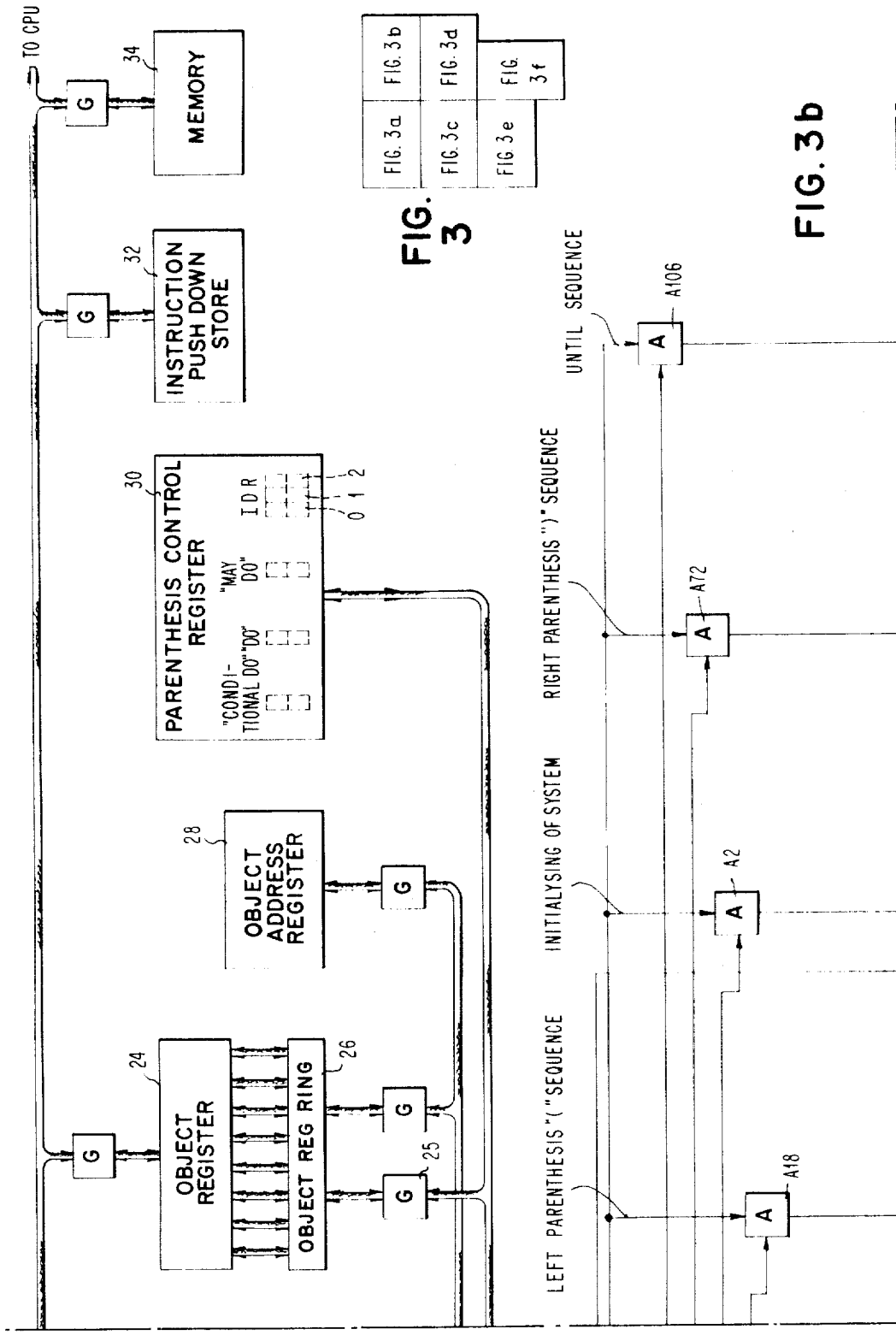

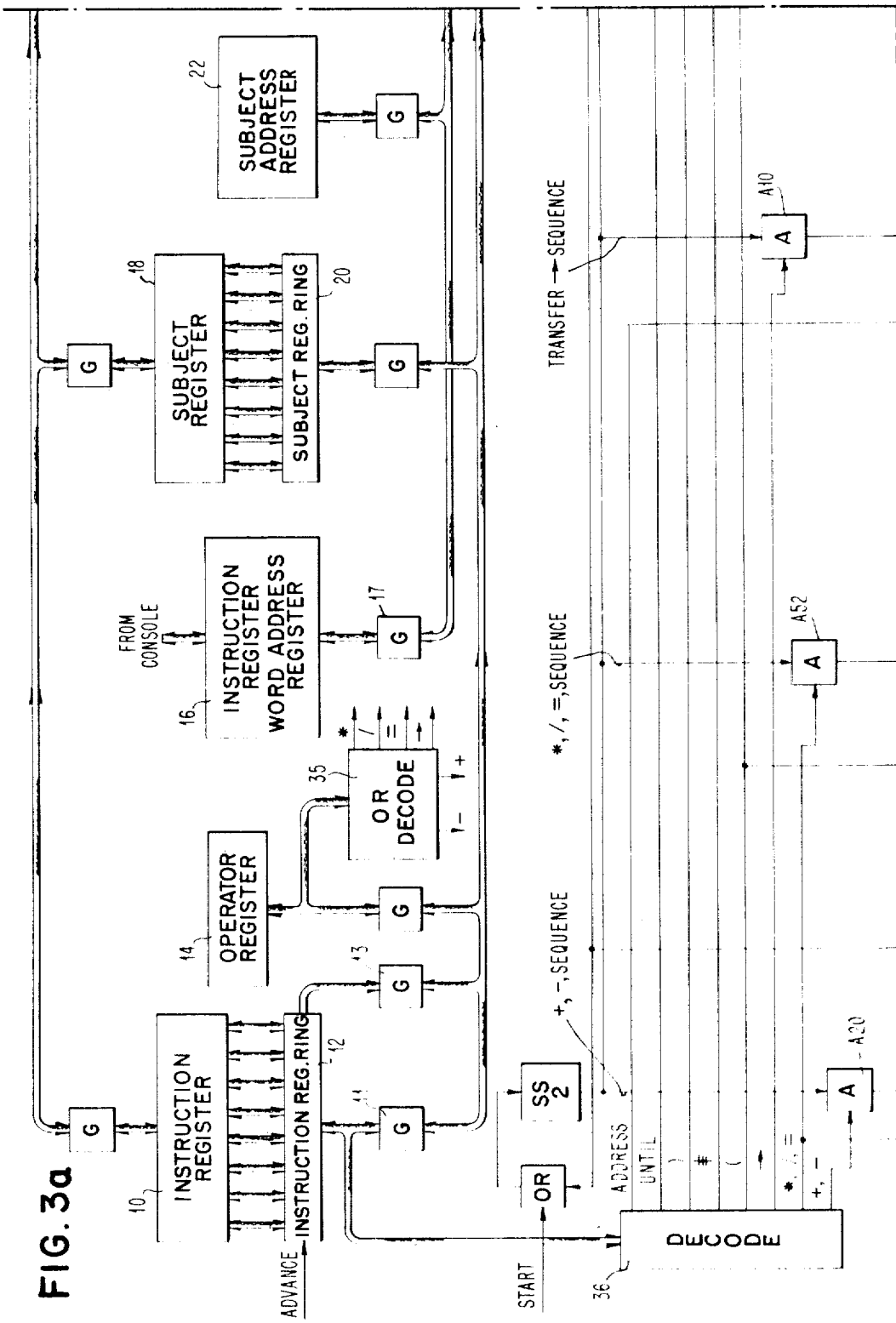

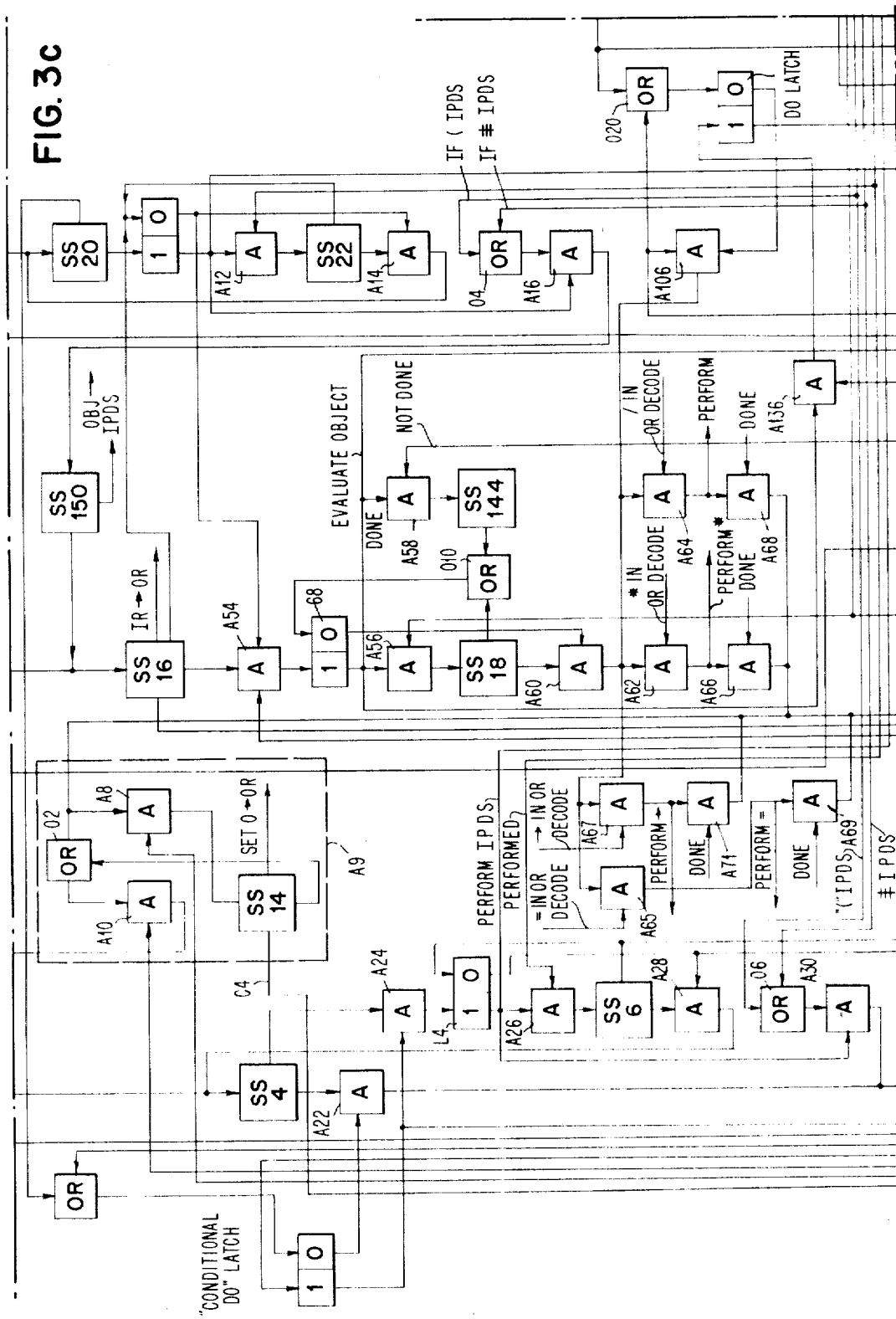

3,293,616
COMPUTER INSTRUCTION SEQUENCING AND CONTROL SYSTEM
Alvin P. Mullery, Chappaqua, and Ralph F. Schauer, Hawthorne, N.Y., assignors to International Business Machines Corporation, New York, N.Y., a corporation of New York
Filed July 3, 1963, Ser. No. 292,606
10 Claims. (Cl. 340—172.5)

The present invention relates to a control system for use with an electronic data handling system and more particularly to such a control system which automatically analyzes and determines the proper sequence of operations to be carried out by a particular machine instruction.

In the majority of present day electronic computers, when an arithmetic or other operation is to be performed, the machine must be given specifically organized machine instructions so that it may automatically perform the computation sequentially from such instructions. In the majority of cases, providing such a detailed sequential instruction system for a computer is neither natural nor convenient. For example, in the simple algebraic expression:

$$A+B*(C+D)-F \to X$$

said result being transferred to a given storage location, the programmer must arrange this operation so that the addition within the parentheses is carried out first, then the multiplication between the quantity B and the quantity within the parentheses is carried out next, then the addition between the quantity A and the result of the multiplication between the quantity B and the previous quantity within the parentheses is carried out and finally, the subtraction between the latter quantity and the quantity F is performed. As can readily be seen, setting forth these steps in proper machine sequence is not the result of sequentially reading through the simple algebraic expression.

It may readily be seen from the above example that a mathematical operation even as simple as this can be quite complicated and involved and a number of special rules must be continually kept in mind by the programmer. Thus, when a problem is to be performed by a computer containing perhaps several hundred such specific mathematical instructions, the ordering and performing of such operations can be extremely involved and will usually require many, many runs on the machine before it can even be established that the program or operations sequence is correct. Further, with various complicated mathematical procedures such as matrix multiplication, square rooting and certain iterative equations, repetitive processes are required until a conditional statement is satisfied whereby the programming becomes even more difficult and cumbersome.

The method usually used in present day computers to effect something approaching a reasonable machine language for use by the machine operator or programmer involves the special machine languages, as they are known, such as Fortran, Cobol, and Lisp to name just a few. Using a machine language such as Fortran, the programmer is able to use instructions which somewhat resemble a standard algebraic expression. However, there are a large number of special rules which must be remembered with such a language which complicate its use and there is a practical limit to the number of problems and the number and type of parenthetical expressions which may be conveniently solved in any one machine operation. Further, when using Fortran language, compilation and assembly of the actual machine language instruction must be performed, both of which require considerable quantities of machine time as well as requiring large sections of memory for storage of the Fortran program and the various other special compilation steps which are required before the actual machine language instruction is produced by the Fortran compiler. It may thus be seen that even using such specialized machine languages, many limitations are placed upon the programmer in terms of the types of operations which can be performed and a great deal of machine time as well as special hardware are required to perform the Fortran stated programs.

It has now been found that hardware may be provided for automatically processing and sequencing machine instructions expressed in standard algebraic or mathematical language of the type illustrated in the simple algebraic example above. Briefly, in the more general sense, the system comprises means for analyzing and recognizing priority of operations and keeping track of such priority, temporarily storing certain operations in an exemplary storage location, further, is able to recognize functional groups of data such as the above-mentioned parenthetical expressions contained within parentheses or brackets of a mathematical expression and assure performance of such parenthetical groups before any other operation is performed. It further incorporates means for immediately performing all operations which can be performed as the instruction is analyzed such, for example, as a string of additions or subtractions, thus, keeping to a minimum the auxiliary storage capacity necessary. Likewise, the system embodies a looping concept wherein iterative steps of a given instruction are readily accomplished without resorting to a complex set of machine instructions on the part of the programmer or special language compiler.

It is accordingly a primary object of the present invention to provide an automatic system for properly sequencing and controlling instructions in a computer system.

It is another object to provide such a system composed of hardware, whereby such sequencing is obtained without the use of special languages and compilers.

A further object of the invention is to provide such a system capable of detecting and assigning priority to various instructional steps encountered in an instruction.

It is yet another object to provide such a system which allows certain steps of the instruction to be performed as the instruction is scanned and does not require a complete scan before the execution of the instruction is begun.

It is another object to provide such a system which is automatically capable of performing conditional instructions.

It is a further object to provide such a system capable of recognizing, performing and properly sequencing instructions included in parenthetical groups.

The foregoing and other objects, features and advantages of the invention will be apparent from the following more particular description of preferred embodiments of the invention, as illustrated in the accompanying drawings.

Figure 1:
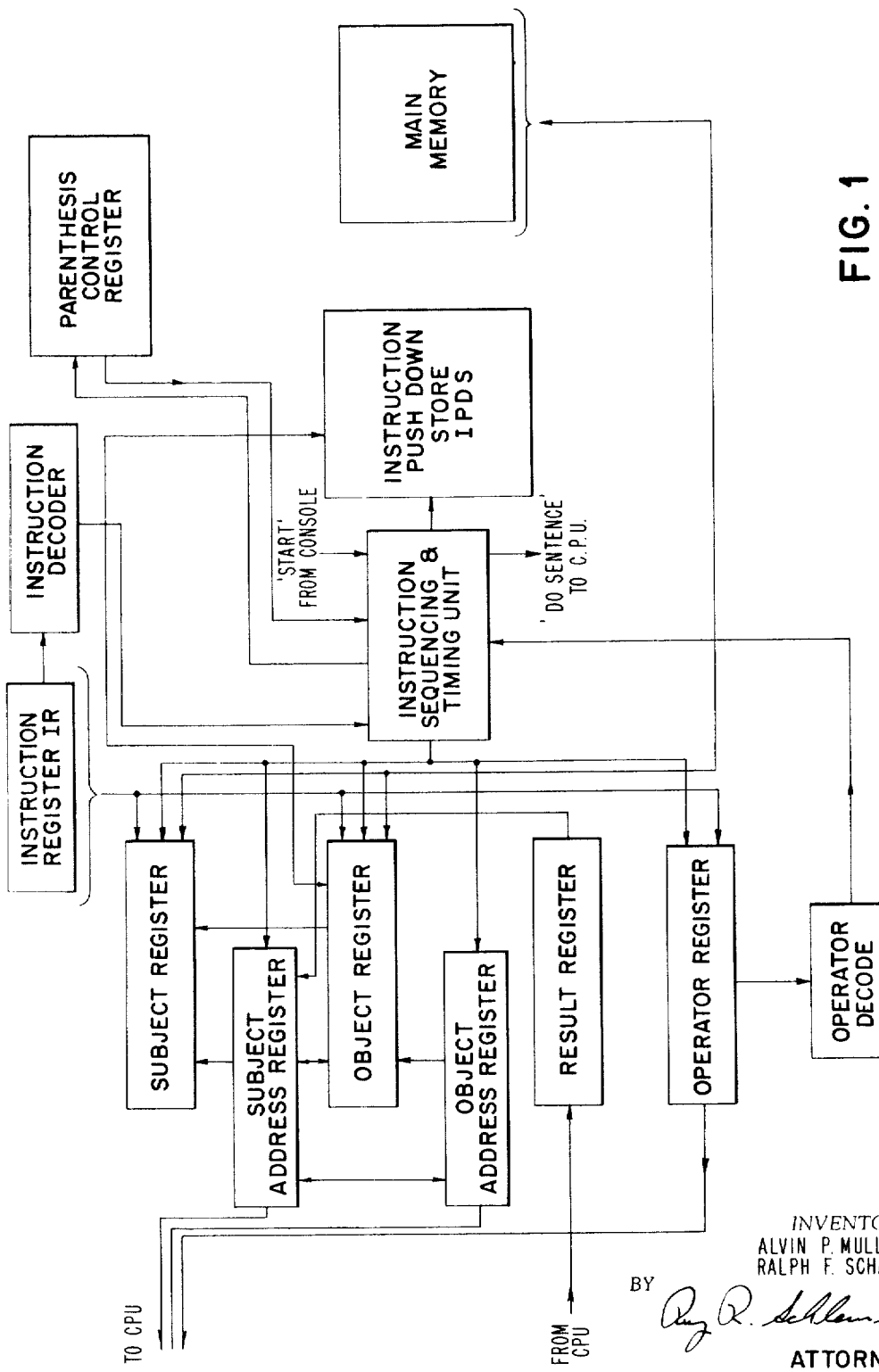
FIGURE 1 is a block diagram of a preferred embodiment of an automatic instruction sequencing and control system for an electronic computer embodying the concepts of the present invention.
Figure 2A:
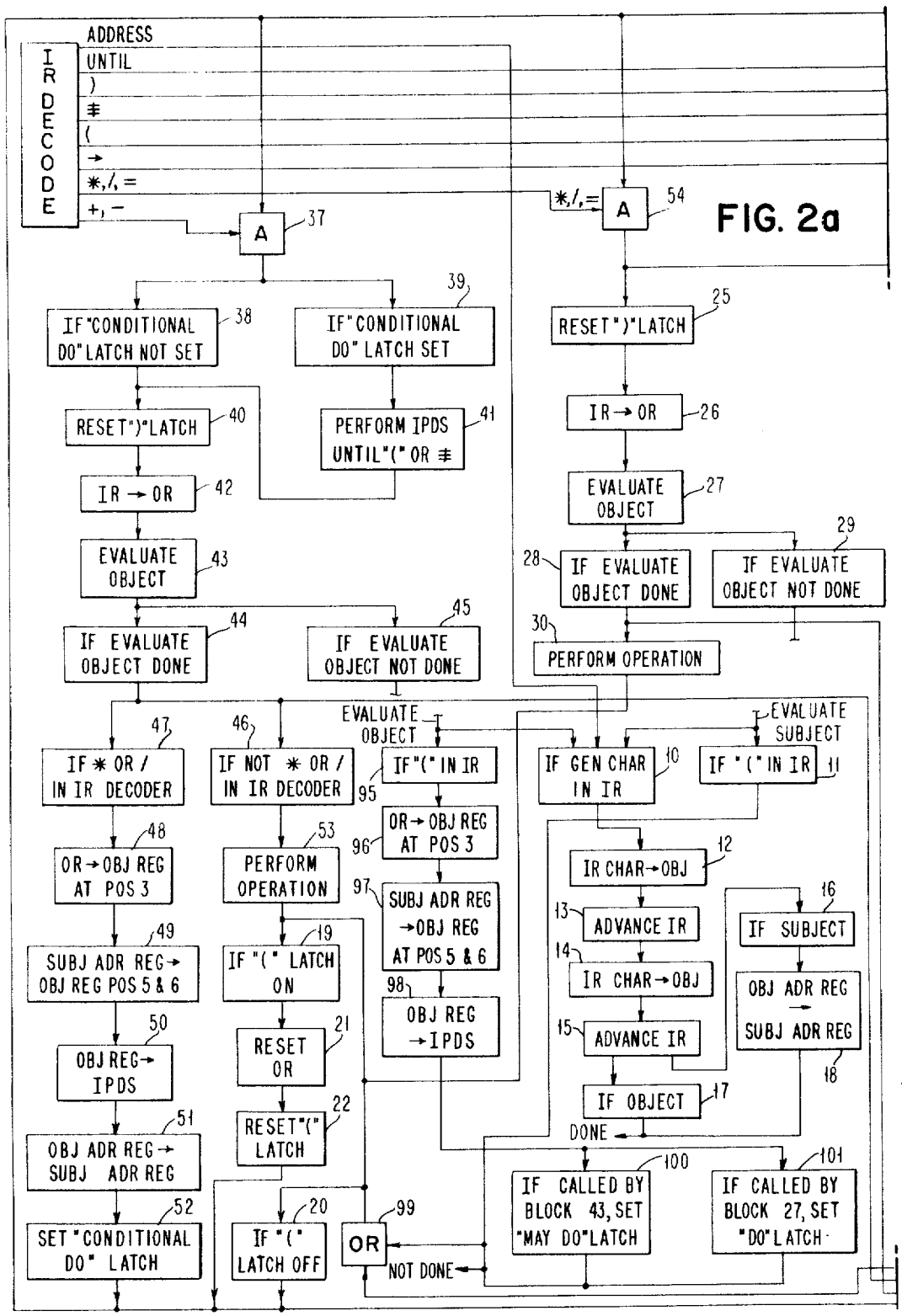
FIGURE 2 is an organizational diagram of FIGURES 2a–2c showing how these figures are to be arranged to form the complete flow chart.
Figure 2B:
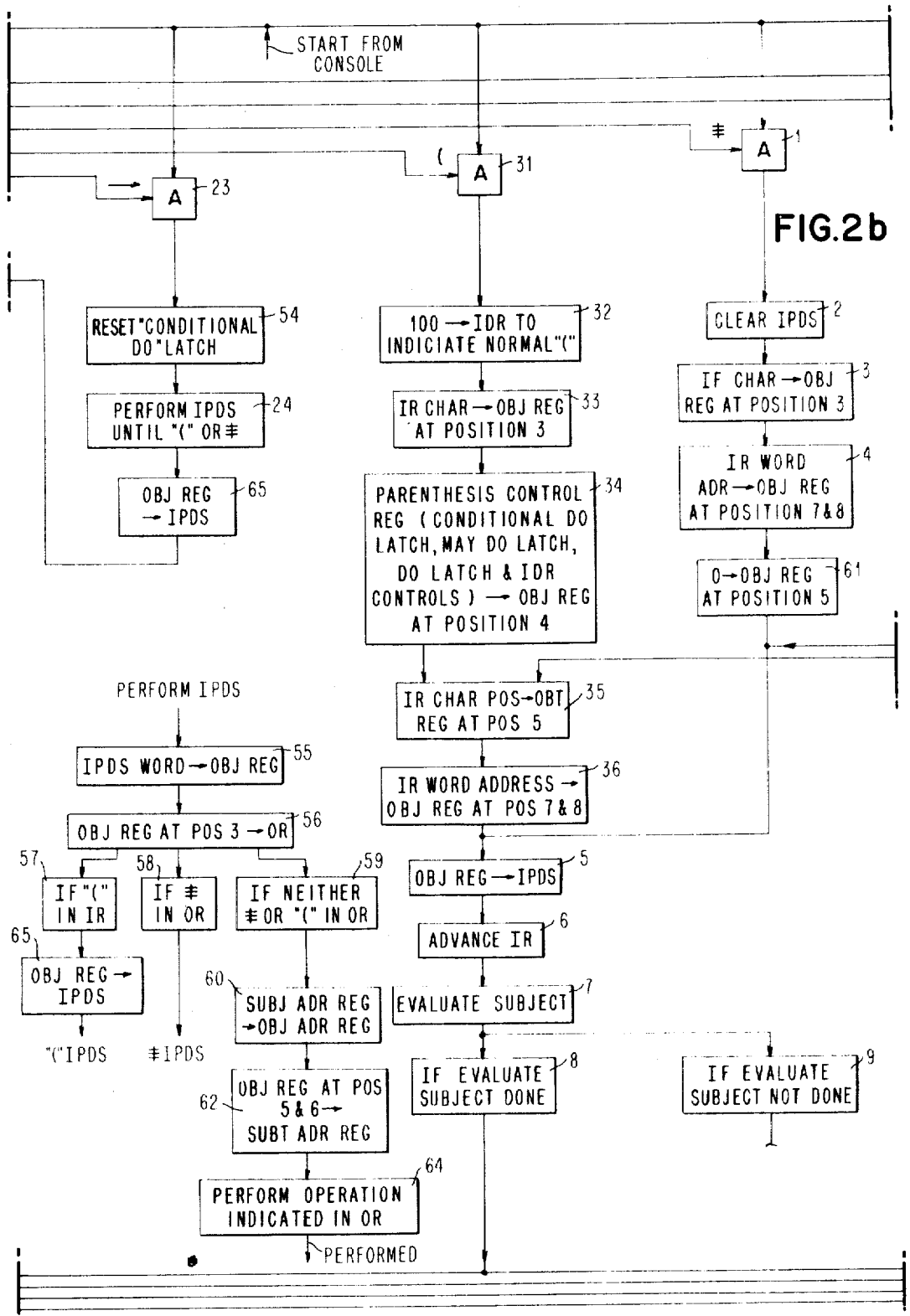

FIGURES 2a–2c constitute a flow diagram or timing chart of the system shown in FIGURES 1 and 3 illustrating the sequential occurrence of events in such a system.

Figure 3D:
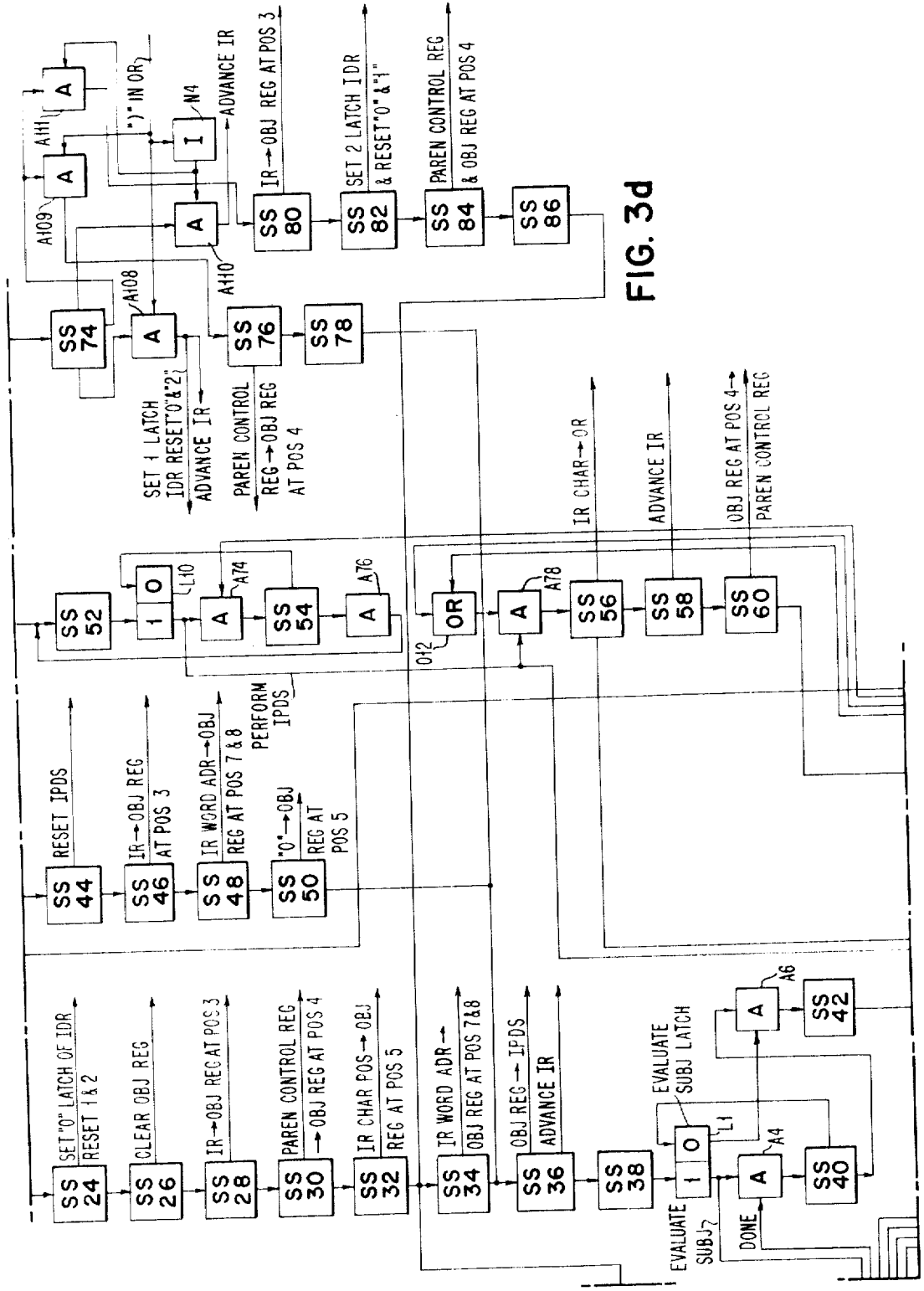
Figure 3E:
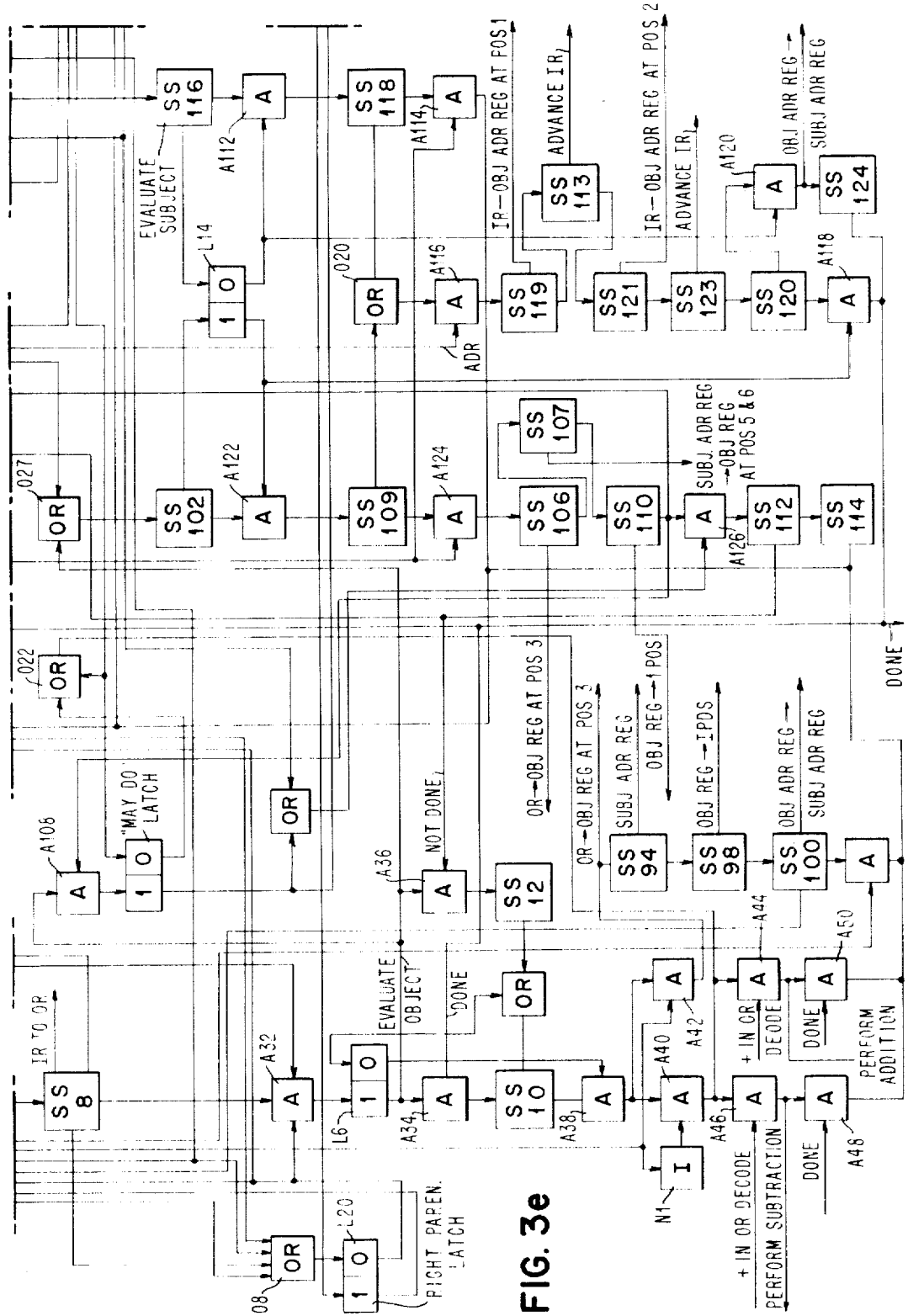
Figure 3F:
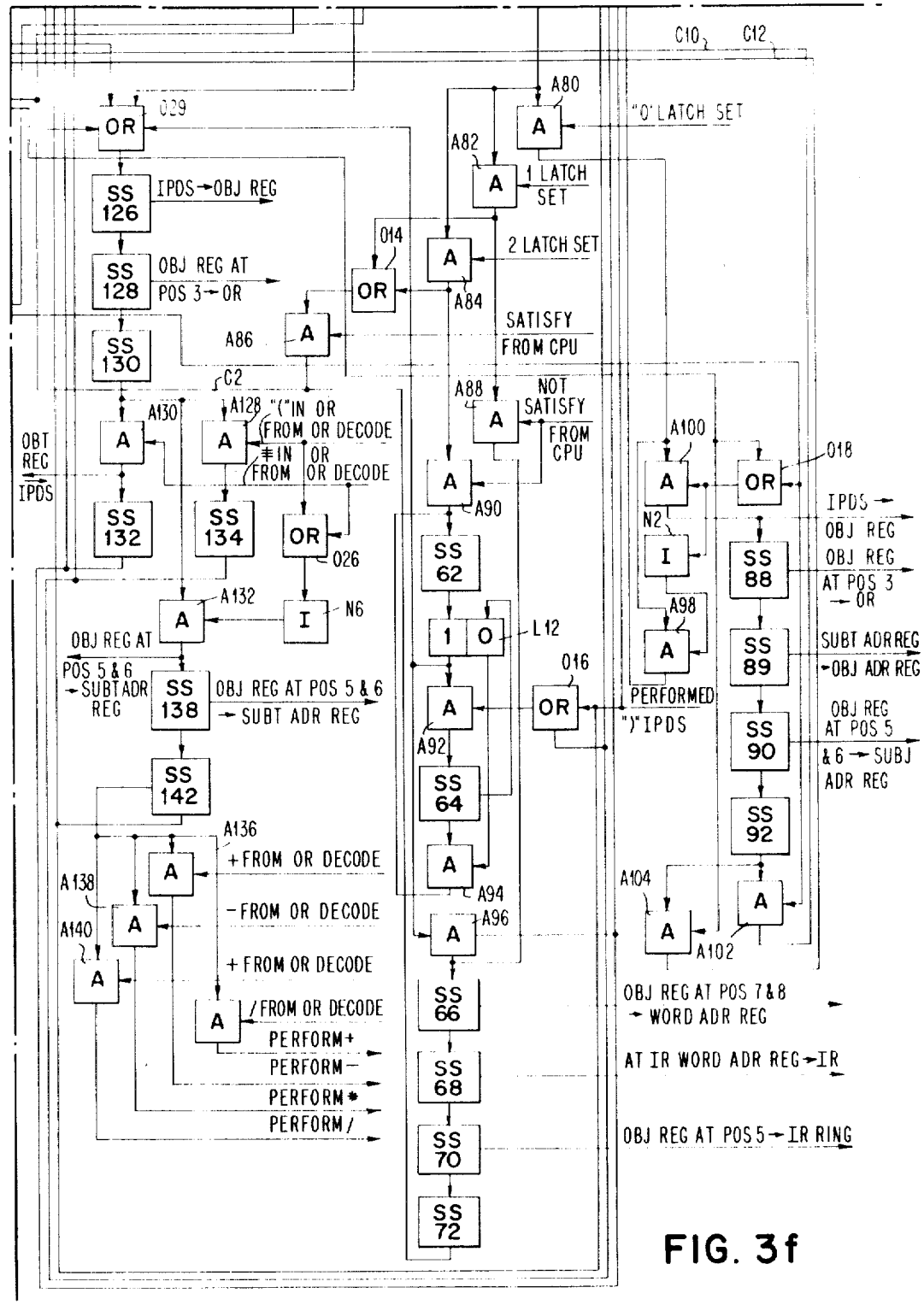

FIGURE 3 is an organizational diagram of FIGURES 3a–3f showing how these figures are to be arranged to form the complete logical diagram.

FIGURES 3a–3f comprise a logical schematic diagram of the complete system necessary for use with the functional block diagram of the system set forth in FIGURE 1.

The objects of the present invention are accomplished in general by a control system for a digital computer having means for automatically interpreting and ordering an instruction sequence. The system includes means for sequentially scanning a given instruction element by element and for determining the priority of computation steps or mathematical functions which are to be performed by the system. Further, means are provided for automatically insuring that all operations within an indicated parenthetical expression are completed before it is attempted to perform an operation incorrectly with less than the complete expression. Further, means are provided for automatically repeating iterative or conditional instructions until a particular condition is satisfied.

In its broadest aspect, the system requires at least a register for storing the actual machine or system instruction in its binary or machine language form. Additionally, registers will be required for storing the subject of a system, operation or instruction, the object of said instruction or operation and the operator itself, which, of course, states the particular operation to be performed whether it be, for example, an addition, substraction, multiplication, division, etc. There must also be a special storage section or memory for temporarily storing the operands and the operators in a sequence and at a time determined from the system controls when such operations must be deferred as will be apparent from the subsequent more specific description of the invention. A memory particularly adapted for this purpose is the "push-down store" memory which is well known in the art. Additionally, various decoders will be required for examining such instructions and determining the nature of the various elements of the complete instruction.

It should be noted at this time that the specific individual functional elements making up the present machine system are quite conventional in nature. For example, such elements as registers, decoders, gate circuits, OR circuits, flip-flops, single shot multivibrators used as clocks and various other logical functional elements making up the system are well known in the electronic and specifically computer arts. The present invention is believed to reside in the over-all concept of the system and not in any of these particular functional blocks or their specific circuitry which are in themselves old. Therefore, the specific structural or circuit details of the various functional elements are not disclosed in the present application but are only described in terms of their very well known functions.

Before proceeding with a specific description of the presently disclosed embodiment of the invention, it is perhaps in order to generally discuss the problems involved in performing a particular mathematical or other problem on an electronic computer, in terms of enabling the computer to know just what operations are to be performed and in what sequence to properly solve a particular problem. Any machine instruction sequence comprises a plurality of instruction sentences. For example, in the previous algebraic expression, $A+B*(C+D)-F \rightarrow X$, this machine operation may be considered to have a plurality of individual instruction sentences comprising a subject, object, and an operator or verb. The sentence $A+B$ implies that A is the subject, the $+$ is the verb and B is the object of the verb. The expression $B*(C+D)$ is another sentence in which B is the implied subject, the $*$ or multiplication symbol the verb, and the parenthetical expression $C+D$ is the object. Continuing the parenthetical expression $(C+D)$ is itself a sentence which contains C as the subject, the $+$ as the verb and D as the object and finally, the sentence $[A+B*(C+D)]-F$ is a sentence in which the bracketed term comprises the subject, the $-$ the verb and F the object. Similarly, the entire expression $A+B*(C+D)-F$ may be considered the subject of the "transfer" operation $(\rightarrow)$, the "transfer" operation itself the verb and the X the object of the "transfer" function which is normally an indication of the address at which the result of the algebraic expression is to be stored in memory.

It is apparent in the above algebraic expression that certain of the verbs or operators may be performed sequentially going through the expression and others obviously may not. As the above expression is analyzed sequentially, the first addition may not be performed until the multiplication of the parenthetical expression with the quantity B and similarly, B may not be multiplied with C until the complete parenthetical expression $(C+D)$ requiring the addition of C and D is first performed. However, once the parenthetical expression has been solved and the multiplication of B and the parenthetical expression carried out, the previous addition may be performed since the operator occurring subsequent to the parenthetical expression is a minus and of the same magnitude with respect to precedence of performance as the previous addition indication. Also, the entire arithmetic or algebraic operation previous to the "transfer" function $(\rightarrow)$ must be performed before this single result may be transferred to the indicated location in memory. Once the arithmetic operation is completed, the result thereof becomes the subject of the "transfer" function and this result will be stored in the indicated location in memory, i.e., at X.

Restating the above propositions in terms of what specific operations the machine must perform in order to properly evaluate the instruction sequence, it will be apparent that scanning the particular algebraic expression or operation to be performed, the machine must recognize the first operand in the string as an operand, must recognize the second character or member of the instruction as an operator, as well as to be able to determine a precedence rating for said operator, examine the third member of the instruction to determine whether it is another operand or a special character, i.e., a left parenthesis "(." If a "(" is encountered directly after the operator, it will be apparent that regardless of what the operator was, the first operand and this operator will have to be temporarily stored until the term within the parenthesis can be determined. If the third term happens to be another operand, the fourth term will have to be looked at to determine whether or not the first sentence may be performed. In the above example, this would be an indicated multiplication (*) between the quantity B and the parenthetical expression. In such case, the quantity A plus the operator addition (+) will have to be placed in a special storage location until this second condition, i.e., multiplication (*) is fulfilled. At this point, the B becomes the subject of the new sentence being evaluated and the multiplication operator the verb and now the next operand will be accessed and since a parenthetical expression is seen, the quantity B plus its associated operator will be similarly placed in special storage until it is possible for this operation to be carried out. Now, the parenthetical expression must be evaluated and the system upon recognizing the "(" then knows that an operand must follow such a parenthesis followed normally by a verb and since in this case, the third member of the parenthetical expression is another operand followed by a "),", the system performs the indicated addition (+). At this time, the system must restore itself to its former position as though the solved parenthetical expression were just another operand and the next term of the algebraic operation checked, i.e., a subtraction (—), to see if the previous multiplication (*), called for may be performed. Since the multiplication (*) has precedence over the subtraction (—), the multiplication (*) between the quantity B and the result of the parenthetical expression which has now been solved is performed and further, since the subtraction (—) verb is of equal order to the addition (+), the addition between the quantity A and the just obtained multiplication between the quantity B in the parenthetical expression is performed and this total result becomes the new subject at this point of the operation evaluation and is suitably located. The system now proceeds to evaluate the quantity F and finding it is an operand, proceeds to evaluate the next quantity and encounters the "transfer" function. Since such a "transfer" function indicates that the entire term preceding same either to the beginning of the instruction or to the left parenthesis "(" of a parenthetical expression containing same is to be transferred, the system automatically is given the indication to proceed with the subtraction between the previous result and the quantity F and the result of this subtraction is again placed in a special result storage location and the member following the "transfer" function is evaluated. Since the value is, in effect, an operand, the system proceeds and by means for a suitable record mark supplied, determines that the end of the operation has been reached and the quantity previously stored in the special storage location is transferred to the suitable address called for by the "transfer" instruction.

From the above general discussion it may be seen that the system, in order to be able to properly evaluate such an instruction, must include a decoding means for recognizing the various portions of the system instruction and storage means for storing those operands and operators which cannot be immediately used or performed due to the nature or arrangement of the instruction. The storage means must have control means associated therewith for storing the various portions of the instruction in the particular sequence and for reading them back out in reverse order. Means are also required for temporarily storing the results of the various operations performed by the system and for determining the priority of the various mathematical operators and special symbols such as the parenthesis, "transfer" functions, "compare" functions and the like which are normally encountered in such machine instructions.

A description of the particular type or form of the machine language utilized by the system of the present embodiment of the invention will now be presented. In the above example, it was merely stated that the quantities A, B, C, D, and F were numbers or represented arithmetic or numerical quantities and that the member X was an address. It should be noted that in such machine instructions, the actual numbers, A, B, C, D, and F would be absolute addresses in the Main Memory of the particular quantities or numbers which are to be operated on and that the instruction or the Decoder would recognize these addresses as general characters. Included are the various arithmetic operation indicators, such as the addition (+), subtraction (—), multiplication (*), division (/), "transfer" function (→), "compare" function (=) and the actual markers for the parenthetical expression, i.e., a left parenthesis "(" and a right parenthesis ")." Further, a special mark is placed with such instructions at the beginning and end of the instruction sequence, this mark or record mark as it is conventionally referred to is shown in the subsequent examples as follows: ( ≠ ).

In the present system and for purposes of describing the present embodiment of the invention, it will be assumed that all of the data is organized in the memory in words of eight, 8 bit characters. Thus, for a typical machine instruction included in the above example, the record marks, the operators, i.e., +, —, *, /, "(," ")," etc., are eight bit binary coded characters taking up one character position in the machine instruction. The address or the quantities or numbers appearing in the instructions require two character positions. This is because the standard word address in a conventional 128 x 128 word organized memory as is utilized in the system to be subsequently described requires that a total of fourteen bits be used to give a complete word address. Of these fourteen bits, seven will be the X address and seven will be the Y address as is well known in the computer arts. For this reason, in the subsequent specific examples the actual quantities or numbers which are being operated on in the particular system instruction are shown as double letters, i.e., AA, BB, CC, etc., thus indicating that each address for such a quantity takes up two character positions in a machine word and, thus, in storage.

As will be apparent from the above description of the requirements for a system capable of automatically sequencing an arithmetic or algebraic machine instruction, certain rules of language and mathematics must, of course, be followed. For example, when a segment or member of the mathematical expression is to be operated upon as a whole, i.e., is to be a divisor, dividend, multiplicand, etc., this portion of the instruction must be surrounded by parentheses to indicate that it is a parenthetical expression which is to be treated as a single quantity once the indicated operations within the parentheses have been performed. Also, after the standard mathematical operations, i.e., +, —, *, or /, there must be an operand on either side whether it be an actual quantity shown in a general character address notation or some sort of a parenthetical expression. In other words, it would not be proper to put an addition and a multiplication operator in contiguous locations as they would obviously be meaningless either in actuality or to the system.

A further very important concept of the present invention is that it allows the automatic sequencing of iterative or recursive operations which require that a particular mathematical operation be repeated until a particular condition is fulfilled. A specific example of such an iterative function is shown in the first example which follows subsequently in the specification, but briefly, it involves performing an operation upon a variable quantity in accordance with a particular formula or instruction and changing the variable by an indicated amount or in an indicated manner in accordance with the instruction and after each operation, comparing the result with a desired result and repeating the instruction until a comparison is achieved. This latter routine is provided for by the utilization of a special "until" symbol which is inserted in the system instruction together with a statement of the condition to be fulfilled. Since it is apparent that such an iterative expression may form only a small section of a complete machine instruction, the system must be provided with means for returning only to the point desired by the iterative portion of the instruction and proceeds through that portion only until the condition is satisfied.

The present system has a portion of its control circuitry arranged to perform just this operation in that as an instruction is being performed, a particular parenthetical expression which may be the subject of an "until" instruction is carried out or performed in the usual manner at which time the "until" instruction is noted. However, means are provided for automatically storing an indication in a special memory location of where any parenthetical operation begins in the instruction sequence so that in the event that an "until" symbol is detected subsequent to the parenthetical expression, the product of this parenthetical expression may be automatically compared with a specified condition and if it does not meet same, the stored indication of the address of the desired parenthetical expression may be recalled and the operation will be repeated until the condition is satisfied. It is also possible that the entire previous instruction is the subject of the "until" in which the beginning record mark ( ≠ ) is alternatively the beginning point for the repeated operation. Suitable control circuitry is provided in the present embodiment for first looking for a left parenthesis "(" and if none was present, returning to the beginning of the instruction sequence.

As stated in the above general description of the requirements for such a system, in the normal course of events when a parenthetical expression is solved and an operator is detected subsequent thereto such as a multiplication, addition, subtraction or division, there would be no need to save the entry point into the parenthetical expression and it would be merely erased from the Instruction or other Storage Register when the operation was completed. However, in the case of the detection of an "until" function, it is necessary to keep the location of the previous parenthetical expresion until the requisite comparison between the result of the previous parenthetical expression and the requirements of the "until" function are completed. Therefore, it is required of the system that the left parenthesis "(" and its relative location in the instruction sequence and also the record mark and its location be maintained in memory until it is at least determined that a conditional or "until" instruction does not follow the parenthetical expression or in the case of the beginning record mark occur anywhere else in the instruction sequence. It should be noted that it is also required by the present system that the actual subject or iterative function to be performed in a conditional statement be properly surrounded by parentheses, if not, the entire previous instruction sequence, and similarly, that the object or the condition to be satisfied be so surrounded in order for the system to properly "evaluate" the function and repeat the iterative operations until the required condition is, in fact, satisfied.

The actual mathematical computations provided for in the present exemplary embodiment as stated previously are addition (+), subtraction (−), multiplication (*), and division (/). Since the majority of actual operations in the machine arithmetic unit or Central Process Unit, (C.P.U.), are actually various combinations of the above four mathematical operations, these operations have been chosen as the ones to be specifically analyzed in the present embodiment and the sequence for a proper machine solution of such a problem explained in detail. Any other operator could be included in a similar manner. As stated previously, the multiplication and the division operation are of equal importance with respect to sequencing or precedence in the machine so that if a string of multiplication and divisions were encountered, each individual multiplication or division could be performed immediately without waiting for a preferential sequence to be performed. Thus in an instruction string, for example, A*B/C*D*E, the A could be multiplied by the B before B was divided by C, or conversely, B could be divided by C before C was multiplied by D, etc. Similarly, strings of additions or subtraction may be performed sequentially without taking into account precedence of operations, that is, $A+B-C+D$ may be performed in the specified serial sequence without effecting the accuracy of the result. Obviously, multiplications and divisions must be performed before additions or subtractions if the proper results are to be obtained.

The special symbols other than the arithmetic or mathematical functions which are provided for in the present embodiment are the right and left parentheses ")", "(", the record mark ( ≠ ), the "transfer" function (→), and the "compare" or "equal" (=) function. By using these symbols, it is believed that virtually any arithmetic operation normally performed in a computer may be properly stated and performed utilizing the automatic instruction sequencing system of the present system. Referring again to the relative precedence given to the arithmetic operators as well as to the special operators or functions, it will be apparent from the above description and also from the description of FIGURES 2 and 3 that the "until" symbol, the left parenthesis symbol, the record mark symbol, the right parenthesis symbol and the "transfer" symbol are separately detected by the system and utilized to start certain system sequences as will be specifically described subsequently. Of these symbols, only the "transfer" (→) and the "compare" (=) are actually sent as instructions to the Central Processing Unit of the computer which performs the particular required arithmetic operation.

The "compare" operator symbol (=) is given the same order of precedence as a multiplication (*) or division (/) in that it takes precedence over an addition (+) or subtraction (−) and also over a "transfer" function (→). However, this may be somewhat misleading as a "compare" function is usually utilized in a conventional or iterative operation and has a simple subject and object and it is, therefore, not normally necessary to take into account the precedence of this function over some other function.

The "transfer" function (→), as stated previously, indicates that its subject or a particular quantity is to be transferred to some address in memory as specified by the instruction. It is, of course, obvious that whatever preceded the "transfer" function in the nature of operands and operators must necessarily be completely performed before the proper "transfer" can take place. In the case of the present system, whenever a "transfer" function is encountered it will indicate that all operations which may be in the temporary storage locations must be performed all the way back to either the beginning of the parenthetical statement in which it is contained or a record mark ( ≠ ) which latter indicates the beginning of the actual instruction sequence. Thus, if the "transfer" operator is located within a parenthetical expression, it is apparent as in the subsequent example, that the operation is to be carried out and the result transferred to the desired address and the particular result in this address is to be treated as a quantity to be used in the performance of subsequent steps in the indicated instruction. It is thus obvious that when a "transfer" function is located within a parenthetical expression, that only that portion of the instruction within the parenthetical expression to the left of the "transfer" function is to be considered the subject of said "transfer" function.

As stated previously in the specification, the present Instruction Sequencing and Control System is intended to be used with a standard computer system having the usual large Memory Section and a Central Processing Unit which is capable of automatically performing the requisite mathematical or arithmetic computations. The Memory System as intended by the present embodiment is a standard three dimensional word organized memory having fixed field length words wherein absolute address into Main Memory is supplied to the proper addressing circuitry therefor and will result in the "read out" of a given word at the appropriate storage location into suitable Buffer Register means which word or segment of data may be utilized in the Central Process Unit for mathematical computation or however may be desired. Such memories are extremely well known in the computer art and it is assumed for the purposes of the present specification that the memory will automatically provide a piece of data when given the proper address or alternatively, will store a given piece of data in a specified address location upon suitable "read" or "write" instruction to said memory.

The Central Process Unit referred to in the present specification is a completely straightforward and standard unit capable of performing the basic arithmetic operations of addition, subtraction, multiplication and division, etc. The C.P.U. must be provided with the operands, i.e., subject and object, as well as an indication of the operation to be performed. The operands are sent to the Central Process Unit (C.P.U.) in terms of their fourteen bit binary addresses as indicated previously and C.P.U. automatically accesses the operands at their respective storage locations, brings them into the various registers within the C.P.U. and performs the indicated operations. Subsequent to the performance of the indicated operations, the C.P.U. automatically stores the result in an accumulator which may be a portion of the Main Memory and the address of this result is again returned to the Instruction Control Unit for use therein as will be more fully set forth subsequently. Together with the result address, a signal is conventionally supplied indicating that the particular arithmetic operation has been carried out.

The following list of references is a rather complete list of standard engineering texts which fully describe the structure and operations of conventional computer memories of the type set forth above and further disclose the structural details and method of operation of the arithmetic units or C.P.U.'s of standard computers. Additionally, disclosed therein are specific circuit embodiments and explanations of the various individual logical functional components set forth in the logical schematic diagram of FIGURES 3a–3f. Since as stated previously, no invention is claimed in any of these individual functional blocks, the Central Process Unit itself or in the Main Memory, the specific details of construction and operation are obviously not suitable for inclusion in the present specification.

"Arithmetic Operations in Digital Computers," by R. K. Richards, also "Digital Computer Components and Circuits," by R. K. Richards (D. Van Nostrand Co., 1957), in the chapter "Magnetic Core Storage"; the article, "Computer Memories: A Survey of the State of the Art," by A. Rajchman, page 104 of Proceedings of the IRE, January 1961, vol. 49, No. 1; the article "A 32,000-Word Magnetic-Core Memory," by Ross and Partridge, page 102 in the IBM Journal of Research and Development, vol. 1, No. 2, April 1957; the IBM 704 and 705 Customer Engineering Reference Manual; and the IBM Customer Engineering Manual for the 7302 Core Storage Unit.

Having generally described the problems involved in sequencing an arithmetic instruction to a computer as well as having specified the general manner of solution of such problems by the present system, a general description of the more basic components necessary in such a system to achieve such sequencing will follow with reference to the general block diagram of FIGURE 1.

It should be understood that FIGURE 1 is intended only to give a broad understanding of the more significant portions of the system insofar as the functions which they perform are concerned. Very briefly, this figure shows those components of the system which function to evaluate an instruction, perform immediately such instructions as may be immediately performed in accordance with standard mathematical rules, store temporarily such functions as cannot be immediately performed, perform other subsequent functions which can be performed before the functions which have been stored and re-access and perform in a proper sequential order those portions of the instruction which have been temporarily stored.

By evaluating and giving certain weighted precedence to various ones of the operation instructions included in the overall instruction set and also the special instructions described previously such as the record marks, (≠), transfer functions (→), "until" functions, "compare" functions (=), etc. The logical circuitry of the system is automatically able to determine the proper sequence for the performance of the various operations of any instructions. The Instruction Register, IR, in the upper left hand corner of the figure is used for storage and sequential examination of the entire instruction sequence arranged in the pattern set forth above and using the particular special symbols mentioned. The Instruction Decoder examines the contents of the Instruction Register a character at a time and determines the nature of the particular character at a particular location in the instruction sequence. The output of this Instruction Decoder performs the key function of telling the sequencing controls what sort of a character is present at a particular location in the Decoder and provides for the setting of the various precedence controls insofar as the instruction words or operators are concerned and also indicates the occurrence of the special symbols such as the parentheses, record marks, "transfer" functions, "until" functions or the existence of the general character address. The output of this Decoder is a plurality of lines which are fed into the Instruction Sequencing and Timing Unit which is, of course, the heart of the present system and actually controls the gating of the various instruction characters into and out of the Storage Registers as well as gating them in the proper sequence to the C.P.U. when such operation is in order.

The Subject and Object Registers are storage registers capable of storing eight character, eight bit per character, words and are used in a manner to be described subsequently with reference to the specific description of a number of operating examples and the logical control circuitry referring to both FIGURES 2 and 3. These registers are used specifically both for the temporary storage and construction of words to be subsequently either utilized in the making computations in the C.P.U. or for transfer to or from the Instruction Push-Down Store (IPDS). The Subject Address Register and Object Address Register associated with the Subject Register and Object Register respectively are the registers used to store the addresses of the various operands encountered in a system instruction. Addresses may be gated into these registers from the Instruction Register and subsequently into the Object Register and then into the Instruction Push-Down Store upon command of the Instruction Sequencing and Timing Unit as will likewise be set forth fully subsequently. The C.P.U. Accumulator stores the result of any arithmetic operation and provides the address in memory or the accumulator of the result of a just completed computation to the Instruction Sequencing and Timing Unit. The Operator Register is used for storage of the actual verb or operator in its eight bit binary form and is transferred into said register either from the Instruction Register upon command or from a particular location of a word which has been stored in the Instruction Push-Down Store after said data is read out of the IPDS for execution of the stored instruction. The only data which will normally be stored in the Operator Register are the actual mathematical operators and the special operator characters such as the parentheses and "until" functions. The Operator Decode block performs the function of analyzing a particular operator to determine whether it is an addition, a subtraction, a multiplication, a division, a "compare," "a transfer," a left parenthesis or a right parenthesis during an actual evaluation sequence as will be described subsequently. The necessity for these determinations will be apparent from the subsequent description of the logical schematic diagram of FIGURE 3.

The Instruction Sequencing and Timing Unit is the heart of the present system and utilizes the outputs of the Instruction Decoder and the Operator Decoder to determine in what manner an operation is to be performed by a machine. The unit comprises physically a plurality of single shots or multivibrators which act as clock stages and which are quite conventional in the computer arts in that when a particular single shot or clock stage is turned on, an output pulse of a finite duration will be produced, and when said single shot turns off, an output or turn off pulse will be produced. These pulses may be used in a manner well understood in the art for achieving the various control functions necessary for timing such a complicated analyzing and sequencing procedure. Basically, a string of such single shots comprises a Synchronous Control Unit in that the single shots are normally tied together end to end so that one function must be completed and another one not started until a first function is completed, and an appropriate output pulse obtained which starts a subsequent cycle. Branching is obtained in the Timing Unit for various control functions by provision of conventional AND and OR gates, flip-flops, inverters, and the like, the specific operation of each of which is notoriously old. It is this unit which generates the various gating signals in cooperation with the outputs of the Instruction and Operate or Decode Units which determine when and if sentences of an input instruction are to be performed at a given time or must be deferred until some later time when they can be properly performed without rendering an incorrect result in the Arithmetic Unit. The block marked Parenthesis Control Register actually comprises six flip-flops and is utilized to, in effect, remember the condition of the various portions of the control circuitry in the Instruction Sequence and Timing Unit at a specified time during an examination of an input instruction. The data contained in this register is stored upon command from the Instruction Sequencing Timing Unit in the fifth character position of the Object Register when it is necessary to defer a certain operation and store same while other operations are being performed. It is the storage of this information which allows the system to properly return to the desired spot in the instruction sequences. As will be explained more fully subsequently this latter step is utilized with the parentheses evaluation sequence.

The block indicated as the Instruction Push-Down Store (IPDS) comprises a multi-position storage or memory having associated therewith addressing means which will place a first bit of information to be stored at a first storage location and will upon further "input" instruction, sequentially store the subsequent segments of information in the memory; but, whenever a "read" instruction is received, the memory will read the information out in the reverse order of that which it was put in. This type of push-down store is quite well known in the art and, basically, in the present system could comprise a portion of Main Memory having an auxiliary incrementing and decrementing counter. Each time a new piece of information is to be stored in memory, the address for the storage location of the new word is obtained by incrementing the counter one position, storing the word and repeating this process every time a new piece of information is stored in the memory and conversely, when it is desired to remove information from the memory, the addressing counter is decremented. It may thus be seen that segments or pieces of information may be placed in the push-down store at an early stage of an instruction sequencing operation and subsequent information put in and removed while not disturbing the originally or first stored information. The form of data stored in the push-down store as stated previously is an eight character, eight bit per character machine word which has been found more than sufficient to store all of the information necessary to perform the instruction sequencing desired in the present system.

It should be noted that whenever an operand is stored, there will also be stored therewith an operator or special character. Whenever a "(" is stored in the Instruction Push-Down Store, there will also be stored therewith an indication of the character position relative to position in the actual system instruction at which the "(" was encountered. The current condition of the Parenthesis Control Register is also stored in a given machine word with the "(" indicator. The purpose of the various addresses and indications stored in the IPDS with the various special symbols will be apparent from the following discussion. It being briefly stated that the various numbers, addresses and condition indicators stored are to place the control circuitry in its status quo at the time that the "(" was first detected in proceeding through the instruction sequence.

As stated previously, although the basic functions of the present system may be broken down into the sequential supplying of an operator and one or more operands to the Central Process Unit or C.P.U. at any given time for execution, the proper sequencing of the system, in accordance with complicated machine instructions, involves somewhat detailed logical circuitry which must necessarily branch at a number of points to perform any one of a number of possible functions. It is believed that the following discussion of FIG. 2, together with Tables 1 through 15 provide the best way of clearly illustrating the functions of the specific embodiment shown in FIGURES 3a–3b which will be hereinafter referred to simply as FIGURE 3. Similarly, FIGURE 2 actually comprises FIGURES 2a–2c but will be referred to hereinafter simply as FIGURE 2.

FIGURE 2 comprises a detailed flow chart or diagram of the present system and by following through same with any given example, the sequence of operations of the system is quite apparent. Two examples have been chosen and will be described with reference to FIGURE 2 and the above-mentioned tables which describe the operations of the system for what is believed to be almost any possible combination of mathematical functions which could be encountered. The first example is of a conditional statement or operation which requires recursive or repetitive execution until a particular condition is met. The other example is included to illustrate the manner in which various ones of the control latches are set in accordance with different mathematical operators occurring at various positions in a sequence with respect to parenthetical terms or expressions. It is believed that the following examples discussed in conjunction with FIGURE 2 and Tables 1 through 15 will clearly explain the operations of the present system.

The specific description of the operation of the logical functional schematic diagram of FIGURE 3 is included only for the iterative example and will suffice to clearly describe the operation of the logical control blocks of the system.

Before proceeding with the description of FIGURE 2 together with Tables 1 through 15, following general description of the functional schematic diagram of FIGURE 3 will first be presented to describe the more important portions of this detailed embodiment of the system and further, the elements of Tables 1 through 15 will be keyed into FIGURE 3 so that what the storage locations of the various members of the table are, where they are located and just how they fit into the over-all system will be readily apparent.

Referring now specifically to FIGURE 3, it will be noted that in the upper portion of the figure, there are four registers, the Instruction Push-Down Store and the Main Memory, which is shown schematically. The registers are the Instruction Register 10, Subject Register 18, Object Register 24, the Parenthesis Control Register 30, IPDS 32 and Main Memory 34. Each of these registers it will be noted, has its own Control Ring to control gating of data into and out of said registers at a desired character location. The Instruction Register Ring 12 normally will merely advance to examine the next character of an instruction stored in the Instruction Register 10. However, it will, of course, be understood that any desired character location can be examined under control of this ring by the application of an appropriate input signal to the ring as will be understood by a person skilled in the art. The IR Control Ring is shown having two gate circuits 11 and 13; gate 11 coming out of the bottom of the ring is energized to read the character out of the IR on which the IR Control Ring is currently sitting while gate 13 on the cable coming out of the end of the IR Control Ring gates out the character position, i.e., 1 through 8, on which the Control Ring is currently sitting. Gate 13 also is effective to reset the IR Control Ring to a desired position upon command of the system.

The Subject Register Ring 20 and Object Register Ring 26 function in substantially the same manner as the Instruction Register Ring 12 in that they can be indexed to the next sequential position or any chosen position of its associated registers may be selected by the ring. Also, any of four, 2 character locations may be chosen by these rings. The Parenthesis Control Register 30 is not the same sort of register as the others, but merely composes a series of six flip-flops located at various places in the Sequencing Unit as discussed previously; however, the condition of these six flip-flops is sampled upon command and stored in the fifth position of the Object Register at certain sequential times of the system operation as will be more apparent from the subsequent specific description. Operator Register 14 (OR) is, as stated previously, for the purpose of storing an operator indicator or symbol, the contents of said register being examinable by the Operator Register Decoder 38 which functions to determine the specific operation called for by the data stored in said register. Instruction Register Word Address 16, Subject Address Register 22 and Object Address Register 28 are substantially the same in that they are capable of storing the fourteen bit Main Memory Word Addresses for an Instruction Word Subject and Object, respectively.

This above section of the system essentially comprises the storage portion in that the various registers together with the IPDS and Main Memory are capable of storing all of the information necessary to perform the proper sequencing of a given arithmetic instruction. The registers provide for both semipermanent and temporary, or one or two cycle, storage while particular operations are being carried out as others are deferred. It will be noted that the Object Register 24 is the one in which most of the writing of information is done in that the specific words to be stored in the IPDS are actually constructed in the Object Register and transferred into the IPDS upon command of the system. The lower portion of the figure comprises essentially all of the timing and control circuitry necessary. As stated previously, the Timing Section is essentially composed of well known functional logical elements including single shots for effecting the proper timing and sequencing of the operation, various flip-flops for setting detected conditions from the Main Decoder 36 and various AND's, OR's and inverter or NOT circuits for obtaining the desired logical functions.

The detailed description of this figure will specifically describe the operation of the individual components; however, it should be noted that the output of the Main Decoder 36 together with the sequential scanning of the instruction actually sets up the sequencing of a given instruction. Once it has been determined that a particular operation is to be performed based on the output of the Decoder 36 together with the various timing and analyzing circuits which will be described specifically, the Operator Register Decorder 38 actually determines what specific mathematical operation is to be carried out and is operative to provide the proper verb or instruction to the C.P.U. again as will be apparent from the specific description.

It will also be noted that the functions of the various general portions of the control circuitry have been indicated with appropriate notations above AND circuits, A52, A10, A18, A2, A72 and A106. This lettering indicates generally the function which is analyzed in the circuitry just below this section. It will be noted generally that the outputs of the Decoder 36 are ANDed with a general "evaluate" signal on line L4. As stated previously, the timing control circuitry generally comprises a large number of single shot multivibrators operating as various clock stages. When the time duration for a sequence step is relatively short, the standard single shot is used. If on the alternative the duration for performing an indicated sequence step is somewhat longer, the flip-flops or latches designated by the prefix L preceding the numerical designation are used. For example, the turn off pulse of a previous clock stage is used to set the latch to its "1" state which will, of course, result in the performance of a desired function and when the function is performed, an accompanying "have performed" or "done" signal will reset the latch to its previous state and thus continue the particular timing sequence. The general exception to these latches are the latches indicated as "conditional do latch," "may do latch," and "do latch."

Stated briefly, the functions of these three latches plus the three IDR or Instruction Decode Register latches, all of which comprise in the Parenthesis Control Register, will now follow.

The "conditional do latch" is a latch set when $a(+)$ or $a(-)$ and its corresponding subject are stored in the Instruction Push-Down Store. When so set, this latch indicates that if at some later time another add or subtract is reached, that this preceding add or subtract in the Instruction Push-Down Store can be performed. This latch, therefore, is used to keep the number of entries in the Instruction Push-Down Store to a minimum. The "do" and "may do" latches are used for a different purpose than the "conditional do latch." In the course of performing a verb, it is required that the object of this verb be looked up; that is to say, the absolute address of this object must be found. However, what may follow the verb is not only an absolute address but a left parenthesis. In this case, it is necessary to go ahead and evaluate the parenthetical statement, but after finishing this evaluation, it is necessary to return to where the evaluation of that original verb was temporarily discontinued. Upon the detection of a left parenthesis, the "do latch" is set if a multiplication or division or "compare" is being performed and the "may do" is set if an add or subtract is being performed. When the end of the parenthetical statement is reached, the condition of the two latches tells which verb to return to. So, if, when the end of the parenthetical statement is reached, the "do latch" is set, control should return to the multiplication, division, "compare" procedure. If the "may do latch" is set, control should be returned to the add or subtract procedure.

The three latches in the IDR namely the 0, 1 and 2 latch are set to indicate three different types of left parenthesis and are utilized primarily for evaluating the "until" or "conditional" type of operations. Assuming that these three latches may store either a "1" or a "0" it should first be stated that only one of the three can store a "1" at any one time. Therefore, there are three possible conditions of operations in which a "1" will be stored in the IDR when a left parenthesis is encountered in an instruction sequence.

When the 0 latch is set or the binary number "1," "0," "0" occurs in the IDR, there is an indication that a normal left parenthesis has been found, that is, where the parenthetical expression is merely a subject or an object of an instruction sentence. When a "0," "1," "0" is set or the number 1 latch of the IDR set to a "1," there is an indication that the particular left parenthesis immediately follows an "until" instruction which has a parenthetical statement as its subject and the "conditional" statement is to return to the previous left parenthesis marker for re-evaluation if such is required. And finally, when the number 2 latch of the IDR is set to a "1" or the quantity "0," "0," "1" is stored in the IDR, there is an indication that the left parenthesis immediately follows an "until" function which does not have a parenthetical statement as its subject and that the "conditional" statement is to return all the way back to the beginning record mark ($\neq$) or starting point of that particular instruction.

The above elements of FIGURE 3 have been explained in detail because as stated previously, these are believed to be the more important functional components of the system. The remaining elements operate in a very normal fashion as indicated in both the logical schematic diagram of FIGURE 3 and in the flow chart diagram of FIGURE 2. The function of the remaining elements is believed to be quite obvious from their arrangement in the circuit diagram, it being reiterated that in a number of situations, the flip-flops were used as opposed to the clock single shots where a sequence was to take a considerably longer period of time there would normally be provided for by the standard output pulse of a single shot.

In FIGURE 3 that rather than use multi-digit numbers, a great many of the logical functional components have been provided with a prefix letter designation. For example, all of the AND circuits are indicated by the letter A preceding the number, the OR circuits by a O preceding the number, the single shots by an s.s. preceding the number, the lines or connecting elements by a C preceding the number and the latches by an L. Due to the complexity of the drawing and the large number of elements, it was believed that this was the clearest way of presenting the invention without resorting to many three and even four digit numbers. Similarly, the outputs of many of the single shots are indicated by the functional result to be performed by said output pulse. It is believed that the function and manner in which these results are obtained is extremely well known in the computer arts and obvious in the figure. Further, to show the details of circuit lines going into a particular gate circuit block for every one of the single shots would render the drawing extremely complicated and difficult to comprehend. For example, such an indication as IPDS→Object Register obviously means that the contents of the first readable position of the IPDS are to be gated into the Object Register over the appropriate lines shown through both the gate circuit of the IPDS and the gate circuit of the Object Register. The manner in which data is gated into and out of Storage Registers or Main Memory is well known in the art and to show a plurality of AND circuits and input lines connecting the outputs of the various single shots with the particular gate circuits would serve no purpose. Similarly, the method of gating a particular character of data into a particular character position of a particular register through the various control rings 12, 20 and 26 is similarly well known. Hence, for the various registers and rings shown in the upper portion of FIGURE 3, a gate circuit is shown above the registers wherever the entire register word is to be read in or out at a time and gate circuits are shown below the particular Control Rings for the individual registers whereby data may be stored in or read out of the registers one or two characters at a time as will be seen in the subsequent description.

The above general description of FIGURE 3 should greatly enhance the following description of the flow chart of FIGURE 2, together with the particular Tables 1 through 15 referred to in the description thereof.

It will be noted in these tables that stored information is shown at various steps during an evaluation procedure of a particular instruction which is to be automatically sequenced by the present system. The first item in the table indicates the contents of the registers. The first is the Instruction Register 10. The entire instruction is shown on this line, but the current contents of the register are indicated by a box surrounding these contents. The vertical arrow below this line of an instruction sequence indicates the position of the IR Control Ring 12. In other words, it states which character is being evaluated by the system or stated conversely, which character is being fed to the Decoder 36. The IR Word Address 16 merely stores the address of the particular instruction sequence word and makes it available to the system in the case of a long parenthetical expression or an iterative or repetitive process which requires re-accessing of the particular instruction at an early point thereof. The Subject Address Register, as is obvious, stores the two character address for any piece of data in Main Memory and the Object Address register performs the same function as the Subject Address Register. The Object Register contents illustrate the eight character word capable of storage in the Object Register at various stages of the sequence and as will be obvious from the various tables, this register is written into by the system for subsequent storage in the IPDS upon the occurrence of certain instructions in the Instruction Register. The IPDS shows a plurality of eight character words indicating generally how they would be stored in the IPDS. For example, the first eight character word to the left represents the first word storage position in the IPDS and proceeding to the right, indicates subsequent word storage positions. As a first item or word is stored in the IPDS, it would be stored in the first, second, third, fourth, fifth, etc., positions in the IPDS and as words are read out, they would be read out in reverse order from the fifth, fourth, third, second and etc., positions of the IPDS. The contents of the IPDS will be illustrated in the discussion of the subsequent example and it will be clearly apparent just how the system utilizes the IPDS to store different instructions appearing in the instruction sequence as the system evaluates the same. The bottom section of the tables indicates the contents of the various latches of the Parenthesis Control Register which have been previously described. The table indicates which latches are set and how the information is used in the system when certain operators are encountered in an instruction set. Having thus generally described the more important functional blocks of the logical schematic diagram of FIGURE 3, together with the meaning of the specific contents of the tables keyed into FIGURE 3, it is believed that the following description of FIGURE 2 together with these tables will be better understood by the reader. Also, with reference to the following description of FIGURE 2 and following tables, it should be noted that the flow diagram contains a number of blocks indicating "If" conditions. It should be understood that these conditions are obviously determined by the IR Decoder and that a particular sequence of the flow diagram is entered by either ANDing with the output of the IR Decoder or by setting appropriate flip-flops as is described more fully in the specific description of FIGURE 3.

The first example will be the instruction $$\neq AA \rightarrow ii(ii+BB*CC \rightarrow ii) \text{ until } (ii=DD)$$

Starting out with all the registers in the condition as illustrated in FIGURE 1, in the Instruction Register (IR) 10 are the first 8 characters of the sample instruction. The IR Control Ring 12 is sitting at the first character, which is the record marker ($\neq$) and in the IR Word Address Register 16 is stored the address of the word in the Instruction Register, namely "$jj$." The Subject Address Register 22, Object Address Register 28, Object Register 24, and IPDS 32 are currently blank and the six latches comprising the Parenthesis Control Register are in the reset or "0" state. Since the IR Control Ring 12 is sitting at the record marker on the block diagram, the IR Decoder 36 is putting out a signal on the record marker line. This is sent to block 1 which is an AND circuit. The output from this AND circuit is sent to block 2. The first thing that is done is that the Instruction Push-Down Store is cleared, which would be its normal condition. This is to get rid of any old information that is left over from a previous instruction. In block 3, the IR character, which in this case is a record marker, is placed in the Object Register at position 3. In block 4, the IR Word Address is placed in the Object Register at positions 7 and 8. Block 5 causes "0" to be placed in the Object Register at No. 5. This is the character portion of the $\neq$. At this time there exists the situation illustrated in FIGURE 2. Control is then returned to block 5. Here the contents of the Object Register are placed in IPDS. The first machine word of IPDS, therefore, has information which was formerly in the Object Register. Block 6 indicates that the IR Control Ring is to be advanced one position. It is now sitting on the first "A." Block 7, next, indicates that the "evaluate subject" subroutine is to be performed. This subroutine is diagrammed just to the left beyond the "perform IPDS" subroutine.

The "evaluate subject" subroutine comprising entering the "evaluate subject" subroutine sequence at Block 10 and 11. If a left parenthesis were in the IR at this present time, which is not true, then a signal would come out of Block 11. If a general character is in the IR, which is true, the first "A" is considered a general character. Proceeding then to block 12, this places this first "A" into the first character position of the Object Address Register called Object₁. Block 15 advances the IR Control Ring to the second "A." Block 14 again places the IR character, this time the second "A," into the second character position of the Object Address Register called Object₂ and the IR Control Ring is advanced one more position. What has just been done is to transfer the address "AA" into the Object Address Register. If an "evaluate subject" subroutine is being performed, the sequence goes to block 16. This then goes to block 18, which causes the contents of the Object Address Register to be placed in the Subject Address Register. This result is illustrated in FIGURE 3.

After having performed block 18 a "done" signal is sent back to the calling sequence, which is block 8. Having evaluated the subject, the sequence returns to blocks 19 and 20, which check the Right Parenthesis Latch L20. If the right parenthesis latch is set to a "1," blocks 21 and 22 place a "0" in the Operator Register, (OR) and reset the right parenthesis latch. Control is then returned to the beginning. If the right parenthesis latch had been reset, then control would have directly passed to the beginning through block 20. At this time, as had been illustrated in FIGURE 3, the IR Control Ring is sitting at the first arrow. Therefore, a signal is on the arrow line out of the IR Decoder. This is sent to block 23 which is an AND circuit. Block 24 causes any unperformed operations in the IPDS to be gated out and performed until either a left parenthesis "(" or (≠) marker is reached. In the present case at the current time, there are no undone operations in IPDS. Therefore, the control proceeds to block 25. This causes the right parenthesis latch to be reset. Block 26 transfers the IR character into the OR. Thus, the arrow is placed in the Operator Register. Next, block 27 causes the "evaluate object" subroutine to be performed. This is similar to the "evaluate subject" subroutine which has been described above. In the "evaluate object" subroutine the control proceeds through blocks 10, 12, 13, 14, and 15, as previously described. This leaves the IR Control Ring at the left parenthesis and places the Object Address which is "ii" into the Object Address Register 28. Since an "evaluate object" is being performed, control proceeds through block 17 to return to the calling block which was 28. The registers are now in the condition illustrated by FIGURE 4. Block 30 is an indication that the Process Unit should perform the operation indicated in the OR or in the data indicated in the Subject Address in Object Address Registers. Then the AA should be transfered to ii. When this had been done, control proceeds to blocks 19 and 20, which as previously described, reset the right parenthesis latch if it had been set. Returning to the beginning, the IR Control Ring is on the first left parenthesis. There is therefore a signal out of the IR Decoder on the left parenthesis line which is sent to AND Block Circuit 31. From here the sequence goes to block 32. This sets the three IDR latches to the state "1," "0," "0." This particular combination, "1," "0," "0," indicates that there is a normal left parenthesis. This distinguishes it from the left parenthesis which follows an "until." Here a special circumstance must be indicated. This will be described later.

Block 33 causes the IR character which is the left parenthesis to be placed in the Object Register at position 3. Block 74 then causes the Parenthesis Control Register 30 which consists of the "do," "may do," "conditional do" and three "IDR" latches, to be placed in the Object Register at position 4. Block 35 causes the location of the left parenthesis, which is the IR character position, to be placed in the Object Register at position 5. Since this left parenthesis is the seventh character of the machine word, a 7 will be placed in this character position. Block 36 causes the IR Word Address which is "jj" to be placed in the Object Register at positions 7 and 8. The contents of the Object Register are then placed in the IPDS, as indicated in block 5. Block 6 then causes the IR Ring control to be advanced, block 7 causes the "evaluate subject" subroutine to be performed. After this has been accomplished, at block 8, the registers are in the condition illustrated by FIGURE 5. After the location of this left parenthesis is in IPDS, the Subject Address Register contains "ii" which will be the subject of this next addition to be performed, and the IR Word Address contains "kk" which is the address of the current machine word in the Instruction Register. From block 8 we proceed to the beginning through blocks 19 and 29 as usual. Since the IR Control Ring is at the +, a signal from the IR Decoder is sent from the + line to block 37, which is an AND circuit. From here, we proceed to blocks 38 and 39. These question the condition of the "conditional do latch." These will be explained in a later example. Now the "conditional do latch" is in the "0" or reset state so we proceed through block 38 to block 40. Block 40 resets the right parenthesis latch, which in this case had already been done. Block 42 causes the IR character, which is a +, to be placed in the Operator Register. Block 43 causes an "evaluate object" subroutine to be performed. This ends up with the address "BB" in the Object Address Register and the IR Ring control on the multiply following the "BB." From block 44 control proceeds to blocks 47 and 48. If the IR Ring control is sitting on a character which is not a multiply or divide, the sequence would proceed normally to perform the operation indicated in the Operator Register. However, a multiply is in the IR and therefore the sequence proceeds through block 47 to block 48. This causes the character in the OR, which is a +, to be placed in the Object Register at position 3. Block 49 then causes the contents of the Subject Address Register, which is "ii," to be placed in the Object Register at positions 5 and 6. Block 50 causes the contents of the Object Register to be placed in Instruction Push-Down Store. Block 51 then transfers the address in the Object Address Register into the Subject Address Register, and block 52 causes the "conditional do latch" to be set. The condition of the registers is shown in Table 6. Control then returns to the beginning. The IR Control Ring is at the multiply and therefore a signal is on the multiply output of the OR Decoder. This signal is sent to block 54 which is an AND circuit and the sequence goes to block 25. This first makes sure that the right parenthesis latch is reset. Block 26 moves the multiply into the Operator Register. Then block 27 causes the object to be evaluated, which results in "CC" in the Object Address Register. Then the IR Ring control is sitting on the arrow (→). When this has been done through block 28, the sequence proceeds to block 30 which causes the multiply to be performed. The result of this multiplication is placed in some available register or storage as determined by the Control Process Unit, (C.P.U.). The C.P.U. indicates in the Subject Address Register where the result has been placed. Assume that the Process Unit has placed the result in some location called "BC." Therefore, as a result of block 30, the registers are in the condition indicated in FIGURE 7. From the block 30, control returns through blocks 19 and 20 to the beginning.

Now there is a signal out of the IR Decoder on the "transfer" function (→) line. This is sent to block 23. First the "conditional do latch" is reset through block 54. Then block 24 causes the IPDS to be performed until a left parenthesis or ≠ is reached. The "perform IPDS" subroutine will now be explained to show how it is accomplished.

Block 55 causes the current Instruction Push-Down Store word to be placed in the Object Register. This is the word which currently contains the + and the address "ii." Thus, in position 3 of the Object Register is a +, and in positions 5 and 6 of the Object Register is "ii." Block 56 then causes this + in position 3 of the Object Register to be placed in the Operator Register. Proceeding then to blocks 57, 58, and 59, if a left parenthesis were in the OR, control would proceed through 57. If a sentence marker were in the OR, control would proceed through block 58. However, if neither a left parenthesis nor a sentence marker is contained in the OR, control proceeds through block 59. Since a + is in the OR, control does, in fact, proceed through 59. Block 60 forces the address which is in the Subject Address Register to be placed in the Object Address Register. This was the address "BC." Block 62 causes the address in the Object Register at positions 5 and 6 to be placed in the Subject Address Register. This is "ii." At this time, the contents of the registers are shown in Table 8. Block 64 then causes the operation indicated in the OR, which is a +, to be performed by the C.P.U. on the data whose addresses are in the Subject and Object Address Registers. When this is done, the result, as usual, is placed in some location and the address of this location placed in the Subject Address Register. Assume this address to be "IC."

Control then returns to the calling sequence on the "performed" line. Since a left parenthesis or ≠ was not found, this subroutine is repeated. Control then goes through block 55 reading out the next word from the IPDS into the Object Register. This is the word containing the left parenthesis. Block 56 causes the left parenthesis to be placed in the OR. Since then, a left parenthesis is in OR, control proceeds through block 57 57 to block 65 which returns this word in the Object Register to the IPDS. Now control proceeds to block 25. Since a left parenthesis has been recorded, block 25 again causes the right parenthesis latch to be reset if it had not been. Block 26 causes the IR character to be placed in OR. This is now a transfer function (→). Block 27 evaluates the object. This places in the Object Address Register "ii" and leaves the IR Ring control on the right parenthesis. Through block 28 control goes through to block 30 which causes the operation indicated to be performed. Thus, the quantity, ii+BB * CC, indicated by the address "IC" in the Subject Address Register is placed at the location indicated by the Object Address Register which is "ii." The parenthetical statement is now being performed and control returns to the beginning. The right parenthesis is currently the character pointed at by the IR Control Ring, and therefore a signal is on the right parenthesis line out of the IR Decoder. This line is proceeded to block 67. Proceeding from block 67 to block 68 causes the IPDS to be performed until a left parenthesis or ≠ is reached. Since a left parenthesis is immediately found in the IPDS, in effect, nothing happens except that the Object Register now contains the last word of IPDS. Block 69 causes the right parenthesis to be placed in the OR.

Block 70 advances the IR Control Ring to the "until," and block 71 causes the contents of position 4 of the Object Register to set the Parenthesis Control Register. Thus, "the do," "may do," and "conditional do" latches are reset. The 0 IDR latch is set and the 1 and 2 IDR latches are reset. The current state of the registers is shown in FIGURE 9.

Since the 0 latch of the IDR is set, control proceeds through block 72 to blocks 75 and 76. Since the "do" and "may do" latches are off, control immediately proceeds to the beginning, bypassing and resetting right parenthesis latch. The IR Control Ring is at the "until" character and a signal therefore is on the "until" output of the IR Decoder. This signal is sent to block 105, and then to blocks 106 and 110. In this case, a right parenthesis is in the OR, so control would proceed through block 110. When a right parenthesis is in the OR, this would indicate that, depending upon the result of the conditional statement following the "until" instruction, we would return to the corresponding left parenthesis. If there had not been a right parenthesis in the OR, that would mean that control would return to the preceding record marker (≠) depending again on the result of the conditional statement following the "until." Following through for this case from block 110, control would advance the IR block 111 to the following left parenthesis. This would put this left parenthesis in the Object Register at position 3, and would set latch 2 of the IDR to indicate that a "conditional" statement is being evaluated which should return to the record marker, and then the Parenthesis Control Register which contains this information is placed in the Object Register at position 4. Returning to block 35, this puts the position of the left parenthesis into the Object Register at position 5 and the address of the instruction machine word in which the left parenthesis is contained in positions 7 and 8 of the Object Register, and finally the contents of this Object Register are placed in the IPDS. However, in this case, control would proceed through block 106, block 107 would cause the 1 latch of the IDR to be set. Block 108 would advance the IR to the left parenthesis and block 109 would then cause the Parenthesis Control Register which contains the indication that "conditional" statement which is now to be evaluated is part of an "until," to be placed in the Object Register at position 4. The contents of the Object Register are then placed in IPDS as indicated in Block 5.

Block 6 indicates that the IR Control Ring should be advanced to the first "i" following the left parenthesis. Block 7 causes the "evaluate subject" subroutine to be performed which places "ii" in the Subject Address Register and leaves the IR Control Ring on the "compare" operation (=). The system control is now in the condition shown in Table 10. Control is returned to the beginning via Block 8. Since now the IR Control Ring is at the "=," a signal is on the "=" line on the IR Decoder. This is the same line as the multiply-divide, and the procedure followed is the same and need not be described. After this operation has been performed, in block 30, a "satisfy" or "not satisfy" signal is returned to the system from the Process Unit. The IR Control Ring is now at the last right parenthesis, and control returns to the beginning at which time the right parenthesis line from the IR Decoder has a signal. This signal is sent to block 67. Block 68 causes the IPDS sequence to be performed until a left parenthesis is reached, which results in the last word of IPDS containing the left parenthesis being placed in the Object Register. The IR character which is the right parenthesis is placed in the OR, and the IR advanced to the final sentence marker. The contents of the Object Register at position 4 are placed in the Parenthesis Control Register which resets the "do," "may do" and "conditional do" latches, resets the 0 and 2 IDR latches and sets the 1 IDR latch. Since the 1 IDR latch is now set, control proceeds through block 73 to block 86 and 87. If the "satisfy" latch has been set to a "1," control proceeds on, and therefore gives from block 86 to the beginning and proceeds onward. If the "satisfy" latch was not set, i.e., "0" namely if the conditional statement following the "until" were not satisfied, the system sequence would return to the point in the instruction at which the left parenthesis preceding the "until" occurred. This address is currently in the Object Register. Control therefore places the contents of the Object Register at position 7 and 8 in the IR Word Address Register. This is address "*jj*." Block 90 indicates that Main Memory is accessed at "*jj*" and this word placed in the IR. The contents of the Object Register at position 5 then set the IR Control Ring.

The system is left with the situation shown in Table 11. Control then returns to the beginning and proceeds as before when the IR Ring control was at this point. Blocks 85 through 91 show what would have happened if rather than returning to a left parenthesis, the sequence had returned to a sentence marker. This would have been indicated by the 2 latch of the IDR having been set. Again, if the conditional statement had been satisfied, control would have returned to the beginning and continued normally. If not, it would have performed the IPDS until a record marker had been reached. When this occurs, the address of the record marker is in position 7 and 8 in the Object Address Register. This address is then placed into the IR Word Address Register as indicated in block 89 and then Main Memory is accessed at this place in the IR. Then the IR Ring control is set to the first position and again control returns to the beginning and proceeds as normal.

The above example taken together with Tables 1 through 15 clearly explains the sequence of events of the present system for the evaluation and sequencing of a conditional statement. The following example is less complex and is designed to show conditions where different latches of the Parenthesis Control Register are set. This example will not repeat steps previously set forth above.

The next example to be evaluated referring to FIGURE 2 and Tables 12 to 15 illustrates a system operation when the "conditional do," "may do" and "do" latches are used in the system. The instruction to be considered is as follows: EE+(FF*(GG+HH)+KK*LL+MM). It will be assumed that the absolute address of EE has already been placed in the Subject Address Register. The add (+) procedure is then followed. As usual, a signal is sent to AND circuit 37. At this time, the "conditional do latch" is not set. The Right Parenthesis Latch is reset and the + is transferred onto the OR and then the "evaluate object" subroutine is performed. At this time, the Instruction Register is at the left parenthesis. Therefore, in the "evaluate object" subroutine, block 95 is satisfied and control passes to block 96, through 101. These place the operator which is a + in the Subject Address Register into the Instruction Push-Down Store. Also, however, depending on whether the "evaluate object" subroutine was called by a + procedure or a multiply, divide, "compare" procedure, the "may do" or "do" latch is set. Control is then returned via OR circuit 99 to blocks 19 and 20 which as usual can check the Right Parenthesis Latch, and from there control is returned to the beginning. The IR Control Ring is still at the left parenthesis. This left parenthesis causes a signal to be placed on the left parenthesis line of the IR Decoder which is sent to AND circuit 31. The procedure here is as has been explained in the previous example. However, the condition of the "may do" and "do" latches is indicated with this left parenthesis when the Parenthesis Control Register contents are stored in the Object Register at position 4 and later placed in the IPDS. Table 12 illustrates the condition just after the contents of the Object Register have been placed in IPDS. In block 60 the IR Control Ring is advanced and the "evaluate subject" subroutine is performed, which places in the Subject Address Register the add address FF. Next, the multiply is in the IR and control proceeds to AND circuit 54. In the "evaluate object" subroutine called for in block 27 a left parenthesis is met. This time, however, it was met in the performance of the multiply procedure. Therefore, the "do latch" is set in block 101. Next, again, the normal left parenthesis procedure places the left parenthesis, the contents of the Parenthesis Control Register, and the location of the left parenthesis in IPDS. Table 13 illustrates the condition after block 5 has been performed. The parenthetical statement GG+HH is performed. The right parenthesis is then met. A signal is on the right parenthesis line from the IR Decoder. This signal is sent to AND circuit 67. Block 68 causes anything undone in the IPDS after the preceding left parenthesis to be performed. Block 69 causes the right parenthesis to be placed in the Operator Register. Block 70 advances the IR to the following +. When the IPDS has been performed in block 68, a result of this performance was that the first machine word of the Instruction Push-Down Store was left in the Object Register. Block 71 causes the fourth character position of the Object Register to be placed in the Parenthesis Control Register which rests the "do latch," resets the "may do" and "conditional do" latches, sets the 0 IDR latch to "1" and resets the 1 and 2 IDR latch. Since the 0 IDR latch is set, control proceeds to block 72. At this time, the "do latch" is on. Therefore, control goes to block 75 and then to 77. Block 77 causes the next word in the Instruction Push-Down Store which contains the multiply and the address FF to be placed in the Object Register. Block 80 causes the address in the Subject Address Register, which is the address of the result GG+HH, to be placed in the Object Register. Next, block 78 causes the multiply to be taken out of the third position of the Object Register and placed in the Operator Register. Block 79 causes the address at positions 5 and 6 of the Object Register to be placed in the Subject Address Register. Table 14 shows the situation at this time. Since the "do latch" is set, control is transferred through blocks 81 and 84 to block 30, which causes the multiplication indicated in the Operator Register to be performed. Next, the + is performed. After the object has been evaluated and the address KK placed in the Object Address Register, block 47 will question if there is a multiply or divide in the IR which there is, in fact. Block 48 causes the + in the Operator Register to be placed in the Object Register at position 3. Block 49 will cause the address in the Subject Address Register which is the address of the operation FF*(GG+HH) to be placed in the Object Register at positions 5 and 6. Let us call this address FH. Block 50 then causes the Object Address Register containing the + and the address FH to be placed in Instruction Push-Down Store. The address in the Object Register which is KK is then placed in the Subject Address Register. Block 52 causes the "conditional do latch" to be set. At this time, Table 15 illustrates the current condition. Control is returned to the beginning and the multiply performed. The address of this multiplication of KK and LL is left in the Subject Address Register. Next, the following + is performed. However, right away the "conditional do latch" is interrogated and it, in fact, is set to a "1" and the Instruction Push-Down Store is performed until a left parenthesis is reached. Therefore, the result of the multiplication KK and LL is added to the result of the previous operations until the left parenthesis is reached. In other words, the data at address FH, namely the result of FF*(GG+HH), is added to the result of the multiplication KK*LL before the addition with MM is performed. The purpose of the "conditional do latch" may now be clearly seen. It is to perform operations contained in the Instruction Push-Down Store as soon as they can be performed rather than waiting until a right parenthesis is reached to perform all undone operations in Instruction Push-Down Store. The required size of an Instruction Push-Down Store is kept, therefore, to a minimum. The operation of the "do" and "may do" latch have previously been illustrated in this example.

TABLE 1

| REGISTERS | |
|---|---|
| Instruction Register | ‡AA→ii(ii i + B B ✱ C C→i i ) until ( i i = D D ) ‡ (jj above, ↑ below) |
| Instruction Register Control Ring | |
| Instruction Register Word Address | i i |
| Subject Address Register | ☐☐ |
| Object Address Register | ☐☐ |
| Object Register | ☐☐☐☐☐☐ |
| Instruction Push-Down Store | ☐☐☐☐☐☐☐☐☐☐☐☐☐☐☐☐☐☐☐ |
| Operator Register | 0 |

LATCHES

| | | |
|---|---|---|
| Do | 0 | ⎫ |
| May Do | 0 | ⎪ |
| Conditional Do | 0 | ⎬ Parenthesis Control Register |
| IDR ⎰ 0 | 0 | ⎪ |
|       ⎨ 1 | 0 | ⎪ |
|       ⎱ 2 | 0 | ⎭ |

TABLE 2

| REGISTERS | |
|---|---|
| Instruction Register | jj ‡AA ii (ii i + B B ✱ C C→i i ) until ( i i = D D ) ‡ (↑ below) |
| Instruction Register Control Ring | |
| Instruction Register Word Address | i i |
| Subject Address Register | ☐☐ |
| Object Address Register | ☐☐ |
| Object Register | ☐☐ ‡ 0 j j |
| Instruction Push-Down Store | ☐☐☐☐☐☐☐☐☐☐☐☐☐☐☐☐☐☐☐ |
| Operator Register | ☐ |

LATCHES

| | | |
|---|---|---|
| Do | 0 | ⎫ |
| May Do | 0 | ⎪ |
| Conditional Do | 0 | ⎬ Parenthesis Control Register |
| IDR ⎰ 0 | 0 | ⎪ |
|       ⎨ 1 | 0 | ⎪ |
|       ⎱ 2 | 0 | ⎭ |

TABLE 3

| REGISTERS | |
|---|---|
| Instruction Register | ǂ A A → i i ( i i + B B * C C → i i ) <u>until</u> ( i i = D D ) ǂ     (jj, ↑ under the 4th position) |
| Instruction Register Control Ring | |
| Instruction Register Word Address | i i |
| Subject Address Register | A A |
| Object Address Register | (empty) |
| Object Register | (empty) |
| Instruction Push-Down Store | [ ][ǂ][ ][i i][ ]... |
| Operator Register | (empty) |

LATCHES

| | | |
|---|---|---|
| Do | 0 | ⎫ |
| May Do | 0 | ⎬ Parenthesis Control Register |
| Conditional Do | 0 | ⎭ |
| ∏ DR  0 | 0 | |
|        1 | 0 | |
|        2 | 0 | |

TABLE 4

| REGISTERS | |
|---|---|
| Instruction Register | ǂ A A → i i ( i i + B B * C C → i i ) <u>until</u> ( i i = D D ) ǂ     (↑) |
| Instruction Register Control Ring | |
| Instruction Register Word Address | i i |
| Subject Address Register | A A |
| Object Address Register | i i |
| Object Register | (empty) |
| Instruction Push-Down Store | [ ][ǂ][ ][j j][ ]... |
| Operator Register | → |

LATCHES

| | | |
|---|---|---|
| Do | 0 | ⎫ |
| May Do | 0 | ⎬ Parenthesis Control Register |
| Conditional Do | 0 | ⎭ |
| ∏ DR  0 | 0 | |
|        1 | 0 | |
|        2 | 0 | |

TABLE 5

REGISTERS

Instruction Register
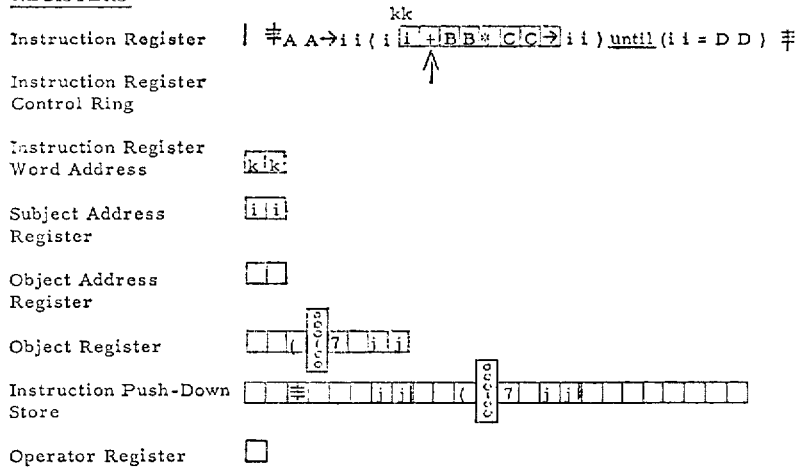

Instruction Register Control Ring

Instruction Register Word Address

Subject Address Register

Object Address Register

Object Register

Instruction Push-Down Store

Operator Register

LATCHES

Do

May Do

Conditional Do

IDR { 0, 1, 2 }

Parenthesis Control Register

TABLE 6

REGISTERS

Instruction Register
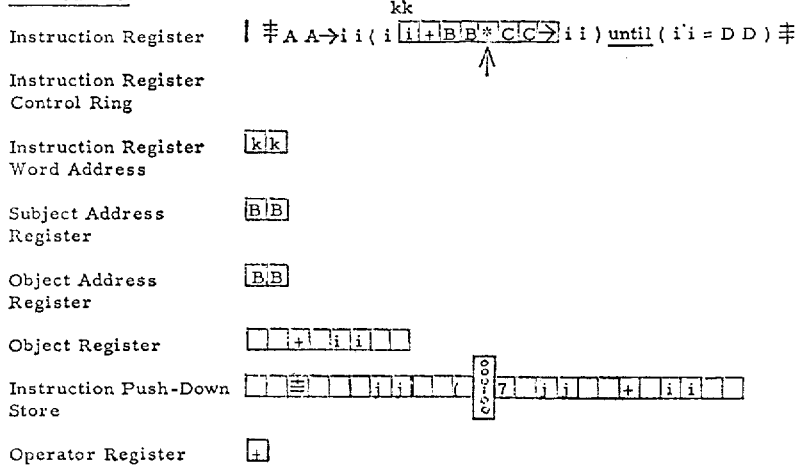

Instruction Register Control Ring

Instruction Register Word Address

Subject Address Register

Object Address Register

Object Register

Instruction Push-Down Store

Operator Register

LATCHES

Do

May Do

Conditional Do

IDR { 0, 1, 2 }

Parenthesis Control Register

TABLE 7

REGISTERS

Instruction Register | ‡ A A → i i ( i [i][+][B][B][*][C][C][→] i i ) <u>until</u> ( i i = D D ) ‡
                                          ↑

Instruction Register Control Ring

Instruction Register Word Address | [k][k]

Subject Address Register | [B][C]

Object Address Register | [C][C]

Object Register | [ ][ ][ ][ ][ ][ ][ ]

Instruction Push-Down Store | [ ][‡][ ][ ][j][j][ ](c c i o n s)[7][j][j][ ][+][ ][i][i][ ]

Operator Register | [*]

LATCHES

Do | [0]
May Do | [0]
Conditional Do | [1]
IDR  0 | [1]
     1 | [0]
     2 | [0]

} Parenthesis Control Register

TABLE 8

REGISTERS

Instruction Register | ‡ A A → i i ( i [i][+][B][B][*][C][C][→] i i ) <u>until</u> ( i i = D D ) ‡
                                          ↑

Instruction Register Control Ring

Instruction Register Word Address | [k][k]

Subject Address Register | [i][i]

Object Address Register | [B][C]

Object Register | [ ][ ][+][ ][i][i][ ][ ]

Instruction Push-Down Store | [ ][‡][ ][ ][j][j][ ](c c i o n s)[7][j][j][ ][ ][ ][ ][ ]

Operator Register | [+]

LATCHES

Do | [0]
May Do | [0]
Conditional Do | [0]
IDR  0 | [0]
     1 | [0]
     2 | [0]

} Parenthesis Control Register

TABLE 9

| REGISTERS | |
|---|---|
| Instruction Register | ǂAA→ii(ii+BB*CC→i i ) i i ( i i = D D ) ǂ  (position 11) |
| Instruction Register Control Ring | |
| Instruction Register Word Address | i i |
| Subject Address Register | i c |
| Object Address Register | i i |
| Object Register | ( 8000 7 j j ) |
| Instruction Push-Down Store | ǂ   i j j |
| Operator Register | ) |

| LATCHES | | |
|---|---|---|
| Do | 0 | |
| May Do | 0 | |
| Conditional Do | 0 | Parenthesis Control Register |
| ΣDR  0 | 1 | |
| ΣDR  1 | 0 | |
| ΣDR  2 | 0 | |

TABLE 10

| REGISTERS | |
|---|---|
| Instruction Register | ǂAA→ii(ii+BB*CC→i i ) until ( i i = D D ) ǂ (position 11) |
| Instruction Register Control Ring | |
| Instruction Register Word Address | i i |
| Subject Address Register | i i |
| Object Address Register | (empty) |
| Object Register | ( 8000 7 j j ) |
| Instruction Push-Down Store | ǂ   i j j   (   8000 7 j j |
| Operator Register | (empty) |

| LATCHES | | |
|---|---|---|
| Do | 0 | |
| May Do | 0 | |
| Conditional Do | 0 | Parenthesis Control Register |
| ΣDR  0 | 0 | |
| ΣDR  1 | 1 | |
| ΣDR  2 | 0 | |

TABLE 11

REGISTERS

Instruction Register: ‡AA→i i ( i )i + B B * C C→i i ) until ( i i = D D ) ‡  
(jj above, ↑ below pointing up)

Instruction Register Control Ring:

Instruction Register Word Address: i j

Subject Address Register: ☐☐

Object Address Register: ☐☐

Object Register: ☐☐ ( 0000 7 i j )

Instruction Push-Down Store: ☐☐ ‡ ☐☐☐ i j ☐☐☐☐☐☐☐☐☐☐☐☐

Operator Register: ☐

LATCHES

Do: 0  
May Do: 0  
Conditional Do: 0  
IDR  0: 0  
IDR  1: 1  
IDR  2: 0

} Parenthesis Control Register

TABLE 12

REGISTERS

Instruction Register: EE+(FF*(G G + H H ) + K K * L L + M M )  
(jj above, ↑ below)

Instruction Register Control Ring:

Instruction Register Word Address: i j

Subject Address Register: ☐☐

Object Address Register: ☐☐

Object Register: ☐☐☐☐☐☐

Instruction Push-Down Store: ☐☐ + E E ☐☐☐ ( 0010 4 i j ☐☐☐☐☐☐☐

Operator Register: +

LATCHES

Do: 0  
May Do: 1  
Conditional Do: 0  
IDR  0: 1  
IDR  1: 0  
IDR  2: 0

} Parenthesis Control Register

TABLE 13

REGISTERS

Instruction Register    E E + ( F F * ( $\overset{kk}{\boxed{GG}+\boxed{HH}}$ ) $\boxed{+K}$ K * L L + M M )
                                           ↑

Instruction Register Control Ring

Instruction Register Word Address    $\boxed{k\,k}$

Subject Address Register    ☐☐

Object Address Register    ☐☐

Object Register    ☐☐☐☐☐☐

Instruction Push-Down Store    ☐☐+☐EE☐☐☐☐(⁰⁻⁰⁻⁰⁻⁰⁻⁰ 4 j j ☐ * F F ☐☐☐(⁰⁻⁰⁻⁰⁻⁰⁻⁰ 8 j j Operator Register    ☐

LATCHES

Do                $\boxed{1}$ ⎫

May Do         $\boxed{0}$ ⎬

Conditional Do    $\boxed{0}$ ⎭    Parenthesis Control Register $\text{I DR} \begin{cases} 0 & \boxed{1} \\ 1 & \boxed{0} \\ 2 & \boxed{0} \end{cases}$

TABLE 14

REGISTERS

Instruction Register    E E + ( F F * ( $\boxed{GG}+\boxed{HH}$ ) $\boxed{+K}$ K * L L + M M )
                                         ↑

Instruction Register Control Ring

Instruction Register Word Address    $\boxed{k\,k}$

Subject Address Register    $\boxed{F\,F}$

Object Address Register    $\boxed{G\,H}$

Object Register    ☐☐ * ☐ F F ☐☐

Instruction Push-Down Store    ☐☐+☐F F ☐☐☐☐(⁰⁻⁰⁻⁰⁻⁰⁻⁰ 4 j j ☐☐☐☐☐☐☐

Operator Register    $\boxed{*}$

LATCHES

Do                $\boxed{1}$ ⎫

May Do         $\boxed{0}$ ⎬

Conditional Do    $\boxed{0}$ ⎭    Parenthesis Control Register $\text{I DR} \begin{cases} 0 & \boxed{1} \\ 1 & \boxed{0} \\ 2 & \boxed{0} \end{cases}$

TABLE 15

REGISTERS

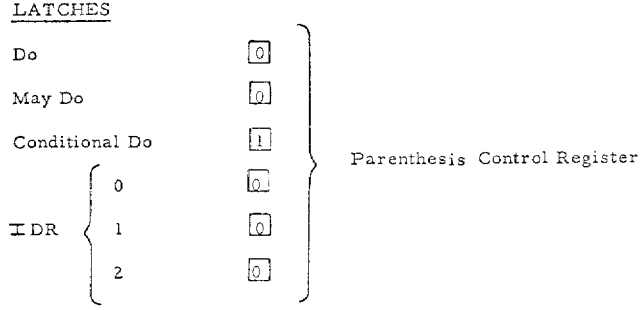

LATCHES

Do, May Do, Conditional Do, IDR 0, 1, 2 — Parenthesis Control Register

---

The logical schematic diagram of the herein disclosed embodiment of the invention as set forth in FIGURE 3 will now be described. The system shown is complete, however, certain elements referred to in this description are not included in the drawing. Such elements include the Central Process Unit which performs the actual addition, subtraction, multiplication, division, "compare," etc. functions. The method and apparatus by which these functions are done are independent of the system, are quite conventional, and as stated previously, therefore, are not described. For the sake of clarity, all interconnections are not necessarily included. For example, when it is desired to "transfer" an address from one Address Register to another, rather than drawing the lines which open or close specific gates connected back to the control circuitry, an indication is made at that point in the drawings, for example, Subject Address Register → Object Address Register, which indicates that the address contained in the Subject Address Register should be transferred to the Object Address Register. Such function and the gating required is notoriously old and the actual drawing of the specific lines is not of any value. As stated previously, the timing control is accomplished by single shot multivibrators (s.s.). A numbered s.s. indicates that all operations on the line coming out of this side of the s.s. should be performed when appropriate and when these operations are performed, this particular timing latch should go off and the next should go under control of the "turn off" signal from the line out of the bottom of the s.s. This is a standard circuit which can be found in any of the above texts.

The diagram shows the instruction sequencing for a certain small number of operations. These operations have been included only to show the operation of this particular system. The system, however, will work on any number of operations. The operations included are:

add, subtract, multiply, divide, "transfer" left parenthesis, sentence marker ($\neq$), right parenthesis, and "until."

Also recognized in the instruction stream are what are called general characters. These characters are used by a programmer for any purpose that he may desire. For an arithmetic instruction, there are conventional addresses which designate operands stored in Main Memory. The add, subtract, multiply and divide indications perform the obvious operations. The left and right parentheses are used in the normal way. The $\neq$ or record marker is used to define the extent of an instruction or record. The compare verb "equal" ($=$) is also included in the instruction set described.

Referring now to the sample instruction:

$$\neq AA \rightarrow ii(ii+BB*CC \rightarrow ii) \text{ "until" } (ii=DD) \neq$$

it will be noted that this instruction is the same as the first example set forth previously. Initially, the first eight characters of this instruction are in the Instruction Register 10 (IR). At the start, the IR Control Ring 12 is such that the first character is on the bus B1, and therefore, is being decoded by the Decoder 36. Since the first character is a $\neq$, the $\neq$ line from the Decoder has a signal on it. Also, initially, s.s. 2 is on line C4 and has a signal on it which results in a signal to both inputs of AND circuit A2. The resulting signal from this AND circuit A2 turns s.s. 44, which in turn causes the Instruction Push-Down Store 32 (IPDS) to be reset. This reset means that the Instruction Push-Down Store should be cleared of all information which has previously been stored in it. Once this has been done, s.s. 46 is turned on, which in turn causes gate 11 of the IR and gate 25 into the Object Register at position 3 to be opened. This results in the character formerly in the IR now being stored in the Object Register at position 3. Once this has been finished, s.s. 48 is turned on. This clock sequence opens the gate 17 from the IR Word Address Register 16 and causes the information contained to be sent to the seventh and eighth character positions of the Object Register. As stated previously, the Object Register is divided into eight characters. Once the IR Word Address has been sent to the seventh and eighth character positions of the Object Register, s.s. 50 is turned on. The signal from s.s. 50 proceeds to the same point as that from s.s. 36. These both cause the contents of the Object Register to be placed in the Instruction Push-Down Store and also the Instruction Register Control Ring 12 to be advanced. What has happened up to now is that the record mark ($\neq$) with its address in the instruction has been placed in the Instruction Push-Down Store. This address is placed in Instruction Push-Down Store so that if later an "until" instruction causes a return to the $\neq$, its address will be available.

The next character is now ready for analysis which is done by advancing the IR. This next character should be part of the subject. It should further, either be a general character which would indicate the address of a piece of data, or a left parenthesis. However, the evaluation of this subject is taken care of in the "evaluate subject" subroutine. This will be described later. What is done here as the result of s.s. 38 going on is that "evaluate subject" latch L1 is set and a signal sent from the "1" side of this latch to the "evaluate subject" subroutine. Once this "evaluate subject" subroutine has been completed, a signal is sent from the subroutine to AND circuit A4. Thus, once the "evaluate subject" subroutine has been completed, s.s. 40 turns on. Single shot 40 causes the latch L1 to be reset to a "0" and once this has been done, the "0" side of L1 is sent to AND circuit A6 and the output from this AND circuit turns on s.s. 42 whose output sends a signal on line C2 which returns to AND circuit A9. A9 is a composite circuit consisting of AND circuits A8 and A10 and OR circuit O2 and s.s. 14, which, if the Right Parenthesis Latch is set to a "1," resets it to a "0" and if the Right Parenthesis Latch is already set to "0," merely goes on through AND circuit A10 and sets s.s. 2. If the Right Parenthesis Latch, as stated, has been set to a "1," it is reset to a "0" and this is accomplished by going through AND circuit A8 whose both inputs are on if the Right Parenthesis Latch is set to a "1" and the turning on of s.s. 14 which sends a signal on line C14 to the Right Parenthesis Latch to reset it to '0."

The sequence has now returned to s.s. 2. However, the IR Control Ring has been advanced one position as indicated above. Therefore, the character in the Decoder 36 is now the character D which is a general character. But, this is actually not true. In the IR at this time is the arrow character, the "transfer" operator. What has happened to D is the "evaluate subject" subroutine has used this character and itself has advanced the IR. As stated, this "evaluate subject" subroutine will be described later.

At this time, s.s. 2 is on with the IR Control Ring at the first arrow character. This is, as usual, gated to the third and fourth character positions of the Object Register and there is a signal out of the Decoder on the "transfer" operator ($\rightarrow$) line. The inputs to AND circuit A10 both have a signal on them. Therefore, s.s. 20 is turned on. This causes the "conditional do latch" to be reset. This also causes latch L2 to be set to a "1," which in turn causes the subroutine "perform IPDS" to be performed. This subroutine will be described later. What it, in effect, does is perform all functions that have been stored in the IPDS up to a given point.

AND circuits A12, A14 and A16 determine at which point the performance of IPDS will be stopped. In this particular circumstance it is necessary to stop performing IPDS when a left parenthesis or a $\neq$ is detected. Therefore, a signal into OR circuit O4 from either the left parenthesis "(" or the $\neq$ output of the instruction stored in IPDS will cause AND circuit A16 to have an output. If, however, the "perform IPDS" has sent a signal back on the "performed" line which indicates that it had not reached a left parenthesis or a $\neq$, s.s. 22 would be turned on. This causes latch L2 to be reset to a "0." Once this has been completed, the two inputs to A14 both have a signal on them and this returns and turns on s.s. 20. This is then repeated until a signal appears on the left parenthesis or $\neq$ IPDS lines, which as stated, puts a signal on both inputs of AND circuit A16 and s.s. 150 is turned on. This causes the contents of the Object Register to be returned to the IPDS. Then s.s. 16 is turned on. From then on, what happens is the same as what would happen for a "multiply" and "divide" operator verb and this will be described when the "multiply" or "divide" operation is explained. In effect, the object is evaluated which in this case will be the "1" and once this has been done, there is a "transfer" function ($\rightarrow$) in the OR Decoder and the operations indicated for the "transfer" function are performed.

Control is then returned on line C11, making sure the Right Parenthesis Latch is reset to "0" and s.s. 2 is again turned on. At this time, the first left parenthesis "(" is on B1 and a signal, therefore, is on the left parenthesis "(" line from the Decoder 36. Both inputs to AND circuit A18 are set, and therefore, s.s. 24 is turned on. This causes a "0" to be emitted to the 0 position of the IDR. Single shot 28 is then turned on and this causes the character currently in the IR, namely the left parenthesis "(," to be transferred to the Object Register at position 4. When this is done, timing latch 32 is set. This causes the current character in the IR to be placed in the Object Register at position 5. The IR character position is the particular character on which the IR Ring is set at said current time. Next, s.s. 34 is turned on which causes the IR Word Address to be placed in the seventh and eighth positions of the object Register. When this is done, s.s. 36 is turned on. At this point, also, the output from s.s. 50 joins. This is, as previously described, the procedure followed when the $\neq$ is met.

At this time, the output of s.s. 36 causes the Object Register contents to be placed in the IPDS and the IR Control Ring advanced. What in effect happens, as was explained with the $\neq$, is that the left parenthesis and its address is placed in the IPDS so that if an "until" verb is met later on, as it will be in this example, the return address is contained in the IPDS, and the return can be effected if necessary. Once the Object Register has been placed in IPDS and the IR advanced, s.s. 38 is set as previously described. This causes the following subject to be evaluated, and when this is done, s.s. 2 is again turned on with the IR Ring not on the following general character but on the first non-general character, in this case, a (+) or addition operator.

The (+) line of the Decoder 36 therefore has a signal on it. Both inputs to AND circuit A20 therefore have signals on them and s.s. 4 is turned on. If the "can do latch" is reset to "0," the output of AND circuit A22 has a signal. If the "can do latch" is set to a "1," the output of AND circuit A24 has a signal on it. This sets latch L4 to a "1" which causes the subroutine "perform IPDS" to be performed. The functions of AND circuit A26, A28, A30, s.s. 6 and OR circuit O6 are as have been described above. When a left parenthesis "(" or record mark ($\neq$) is reached in this IPDS, s.s. 8 is turned on. If the "conditional do latch" had been reset to a "0," the output of A22 would have had a signal on it which would have directly caused s.s. 8 to be turned on. The "conditional do latch" has been set to "1" if there is something in IPDS to be performed. If there is nothing in IPDS to be performed, it would have been reset to "0" and therefore the "perform IPDS" subroutine would have been skipped. Single shot 8 first resets latch L4 to "0" if it had been set to a "1." It transfers the IR to the OR and it resets the Right Parenthesis Latch. Once all of these steps have been completed, the output of AND circuit A32 has a signal on it which causes latch L6 to be set to a "1." This latch L6 calls on the subroutine "evaluate object." This is similar to the "evaluate subject" subroutine in that the following general characters will be evaluated and the address of the data assigned these general characters found and placed in the Object Address Register. If the following characters are a legitimate object, a signal will be placed on the "done" line. If they are not a legitimate object, for example, if the next character is a left parenthesis ")," a signal will be placed on the "not done" line. In this particular case, s.s. 12 is turned on which only causes latch L6 to be reset to a "0." The "evaluate object" subroutine itself causes control to be returned to s.s. 2 under its own conditions. If, however, the "evaluate" subroutine was done, the output of AND circuit A34 has a signal on it which in turn causes s.s. 10 to be turned on. This first resets latch L6 to "0" which when done causes a signal to be placed on the output of AND circuit A38. It will be remembered that the "evaluate object" subroutine, if it had been done, would have left the IR Control Ring on the next character which, in this case, is a multiply (*). The output of AND circuit A38 is ANDed with the output of Inverter N1 from the multiply-divide line from the Decoder 36 at AND circuit A40. It is also ANDed with the direct output of the multiply-divide line of the Decoder at AND A42. If the next character is not a multiply or divide, the add (+) or subtract (−) can be performed and this is done next under control of AND circuits A44, A46, A48 and A50. If, however, a multiply or divide operator were detected, it would not be possible to perform the addition or subtraction. Instead, it would be necessary to store that addition or subtraction and the address of its subject in the Instruction Push-Down Store. This is done through timing latches 94, 96, 98 and 100. Here, first, the contents of the OR, which is a (+) is placed in the Object Register at position 3. The Subject Address Register is gated to the fifth and sixth character positions of the Object Register. The contents of the Object Register are then placed in the Instruction Push-Down Store and the contents of the Object Address Register are transferred to the Subject Address Register. Also, the "conditional do latch" is set to a "1" which indicates that next time a plus or minus is encountered, the system control must return and perform the plus or minus verb now contained in the IPDS. Once the "conditional do latch" is set, the control returns on line C11 to s.s. 2, first making sure that the Right Parenthesis Latch has been reset to "0." In the case of the present example, a multiply (*) would have been detected and therefore, the plus (+) and the address "ii" would have been placed in the Instruction Push-Down Store, and control would then have been returned to s.s. 2. This time the multiply (*) is in the IR and a signal occurs on the multiply-divide output of the Decoder. The two inputs to AND circuit A52 both have a signal and therefore, s.s. 16 is turned on. This first causes the contents of IR to be transferred to the OR which is the Operator Register. The Right Parenthesis Latch is also reset to "0" via line C6. Once these steps have been done, the output of AND circuit A54 will have a signal which will set latch L8 to a "1." This causes the "evaluate object" subroutine to be performed in the manner as has been described previously. If a left parenthesis "(" is met in this subroutine, a signal is placed on the "not done" line which resets latch L8 to a "0" via s.s. 144 and OR circuit O10. If it is a general character, its address is placed in the Object Address Registers and a signal placed on the "done" line. The output from AND circuit A56 then sets s.s. 18 which via OR circuit O10 resets latch L8 to "0." When this has been done, the output of AND circuit A60 goes to AND circuits A62, A64 and A65. If a multiply (*) is in the OR, which it is in this case, a multiplication is performed by the C.P.U. If a divide (/) had been in the OR, a division would have been performed, and if an equal (=) had been in the OR, a "compare" would have been performed. Also, if a "transfer" function (→) had been in the OR, this would have been done as well, as indicated in AND circuits A62 through A71. When the verb has been performed, which here is the multiply, s.s. 2 is again turned on via line C1 after having reset the Right Parenthesis Latch to "0." At this time, the "transfer" operator (→) is in the Decoder. The operation of this verb has been described previously. After it is performed, s.s. 2 is again turned on. At this time, the IR Control Ring is on the right parenthesis ")" and a signal is therefore on the right parenthesis line from the Decoder, AND circuit A72 therefore turns on s.s. 52, which in turn sets latch L10 to a "1." This causes the "perform IPDS" subroutine to be performed in the manner as has been described. It will continue to be performed until the left parenthesis "(" or a ≠ is reached, at which time s.s. 56 is turned on. This causes the IR to be advanced which, when done, turns on s.s. 58. This causes the contents of the Object Register at position 4 to be placed in the Parenthesis Control Register. The IDR is part of this Parenthesis Control Register. If a "0" is in "(" at all positions (IDR at all positions) then it indicates that the parenthetical phrase just evaluated was a normal parenthetical phrase. Control therefore proceeds into AND circuits A98 and A100. If neither the "may do" nor the "do" latch is on (i.e., set to a "1") a signal appears on line L18 which immediately turns on s.s. 2 which is what would have happened in the present example. When the left parenthesis "(" was detected, the 0 latch of the IDR was set to a "0." This was stored in the word in the IPDS with the left parenthesis. Now the 0 latch is again detected in IDR which causes control essentially to go through AND circuit A98 and return to turn on s.s. 2. If, however, the "do" or "may do" latch has been on, which indicates that the parenthetical phrase was the object of either the verbs, add, subtract, multiply or divide, control would have gone through AND circuit A100. This causes, first, the contents of the IPDS to be placed in the Object Register, which, when done, turns on s.s. 88. This check sequence causes the contents of the Object Register in position 3 to be placed in the Operator Register, and contents of the fifth and sixth character positions of the Object Register to be placed in the Subject Address Register. Object Register at position 3 has stored therein the operator or verb which had been stored in the IPDS. Next, s.s. 89 causes the contents of the Subject Address Register to be placed in the Object Address Register. The fifth and sixth character positions of the Object Register contain the address of the subject of this verb, which are now restored to the Subject Address Registers.

Now, if the "do" latch had been set, the output of AND circuit A104 has a signal which on line 110 causes content to return to the AND circuit A62 in the procedure for a multiply or divide after the first resetting of the "do" latch via OR circuit O20 in AND circuit A106. If the "may do" latch were set, then the output of AND circuit A102 would have a signal which returns to AND circuit A34 in the add-subtract procedure after first resetting the "may do" latch via OR circuit O22 and AND circuit A108. The case where 1 or 2 latches of the IDR are set to a "1" and AND circuits A82 and A84 have an output will be described later. However, in the present example, the AND circuit A98 had an output which is returned to timing latch 2. At this time, now, the verb "until" has been in the IR and, therefore, a signal is on the "until" line from the decode which results in an output from AND circuit A106, turning on s.s. 74. If at this time there is a right parenthesis ")" in the Operator Register, then an output results from AND circuit A108. If there had not been, then an output results from AND circuit A110. In the latter case, there was a right parenthesis in the Operator Register which had been left in by the preceding operation. Therefore, the 1 latch of the IDR is set to a "1," the IR is advanced, then s.s. 76 is turned on. This causes the Parenthesis Control Register to be stored in the Object Register at position 4. Single shot 78 is then turned on. Setting the 1 latch of the IDR to a "1" which is now in the Object Register at position 4 indicates that a right parenthesis preceded the "until," and therefore, after evaluating the conditional statement after the "until" and if this conditional statement is not satisfied, the system must return to the address which is stored with the left parenthesis corresponding to the right parenthesis preceding the "until." This address remains in the Object Register since it was placed in the Object Register when the right parenhesis was detected. However, this special left parenthesis is indicated by placing the IDR contents into the Object Register at position 4. If a right parenthesis had not preceded the "until," AND circuit A10 would have had an output which would have first advanced the IR to the next character and then turned on s.s. 80 which would cause the contents of the next character, which is a left parenthesis always, to be placed in the Object Register in position 3, which would then turn on s.s. 82. This causes the 2 latch of the IDR to be set to a "1" which turns on s.s. 84 and then finally the Parenthesis Control Register is placed in the Object Register at position 4.

Single shot 86 is then turned on. Line C16 then returns to the normal left parenthesis sequence just below s.s. 32. Then the current IR character is placed into the Object Register at position 5 and the IR word address placed into the Object Register at the seventh and eighth character positions of the Object Register and s.s. 36 is turned on. At this point, line C14 returns, on which would have been a signal if there had been a right parenthesis in the Operator Register. From then on, the procedure is the same for a normal left parenthesis, which is currently in the IR since the IR has been advanced past the "until." What follows the "until" is always a conditional statement which starts with a left parenthesis and ends with a right parenthesis. In the left parenthesis procedure, the IR is again advanced and the "evaluate subject" subroutine performed. This will leave the IR on the verb equal (=). This verb equal acts just like a multiply or divide insofar as preference is concerned and causes the comparison to be made; however, the results of this comparison are placed in the "satisfy" or "not satisfy" latch. The final right parenthesis is now in the IR. Again, control goes to AND circuit A72 which turns on s.s. 52, this then sets latch L10 to a "1" which asks the IPDS to be performed via the "perform IPDS" subroutine. Since, at this time, there is nothing in the IPDS, a signal ≠ is detected from the IPDS word which puts an output on AND circuit A78. This causes the IR character to be placed in the OR, and this a right parenthesis, the Right Parenthesis Latch is set. Single shot 56 is then turned on, and this causes the IR to be advanced to the ≠. Single shot 58 is then turned on and the Object Register contents at position 4 are placed in the Parenthesis Control Register. In this case, the 1 latch of the IDR is set to a "1" and AND circuit A82 has an output. The output of the AND circuit A82 is sent to OR circuit O14 and AND circuit A88. The output of OR circuit O84 is sent to AND circuit A86. The other input to this AND circuit is the output of the "satisfy," "not satisfy" latch. If the previous conditional statement had been satisfied, it would be desired to continue so the output of AND circuit A86 is the line C2 which then returns control to turn on s.s. 2. If, however, the previous conditional statement had not been satisfied, it would be desired to return to the left parenthesis of the parenthetical phrase preceding the "until." The address of this location is the instruction is currently in the Object Register. This was placed in the Object Register by the "perform IPDS" subroutine. Since this address was initially placed in the IPDS, the perform IPDS would have stopped with the left parenthesis and its address in the Object Register. Therefore, in that circuit, s.s. 66 is first turned on which causes the seventh and eighth character positions of the Object Register to be placed in the IR Word Address Register. This is the word address of that part of the instruction containing the left parenthesis to which it is desired to return. Single shot 68 turning on causes the Memory to be accessed at this location and the contents of this location to be placed in the IR. Next, s.s. 70 turning on causes the contents of the Object Register at position 5 to be placed in the IR Control Ring. This is the particular character position within the instruction machine word of the left parenthesis to which it is desired to return. After this is done, s.s. 72 turns on and control returns to line C2 which returns to s.s. 2. If control were not going to return to a left parenthesis but were going to return to ≠ then a "1" would have been in the 2 latch of the IDR, in which case, AND circuit A84 would have an output. Again, if the "satisfy" latch is set, it is desired to continue so again control returns to s.s. 2. Once the "satisfy" latch is reset to "0," then AND circuit A90 has an output. This causes s.s. 62 to turn on which in turn sets latch L12 to a "1." AND circuits A92, A94, A96, OR circuit O16 and timing latch 64 causes the IPDS to be performed via the perform IPDS subroutine until a ≠ is detected in the IPDS. At this time, therefore, the address of the preceding ≠ is in the Object Register and again s.s. 66 turns on which places the word address of the ≠ in the IR Word Address Register, accesses the memory at this location, and sets the IR Control Ring to the particular character location of the ≠ and again s.s. 2 is turned on.

Three subroutines have been referred to in the above description which have not yet been described. They are the "evaluate subject," "evaluate object," and "perform IPDS" subroutines. These will now be described. The "evaluate subject" subroutine starts with the turning on of s.s. 116. The first latch L14 is reset to "0." This indcates that an "evaluate subject" rather than an "evaluate object" subroutine is to be performed. Then s.s. 118 is turned on. If a left parenthesis is in the IR Decoder at the present time, a signal will be on line C16, and therefore, the AND circuit A114 will have an output. This returns to line C1 which, after resetting the Right Parenthesis Latch, returns to s.s. 2. If, however, a general character were currently in the IR Decoder, then a signal would be on line C18 and AND circuit A116 would have a signal on its output. This would cause the address in the IR to be transferred to the Object Address Register via s.s. 119, s.s. 113, and s.s. 121. When this is done, s.s. 120 is turned on. Since control is in an "evaluate subject" subroutine, latch L14 is reset to "0" and therefore, AND circuit A120 has an output causing the address in the Object Address Register to be placed in the Subject Address Register. Next, control returns to the particular place in the system which called for the subroutine.

The "evaluate object" subroutine commences at OR circuit O22 and s.s. 102. Turning on s.s. 102 causes the latch L14 to be set. Next, s.s. 104 turns on. If C16 has a signal thereon, namely if there is a left parenthesis in the IR Decoder at the current time, the output of AND circuit A124, first causes the contents of the Operator Register to be placed in the Object Register at position 3 and then the address in the Subject Address Register to be placed in the fifth and sixth character positions of the Object Register and then the contents of the Object Register to be placed in IPDS. What has happened is that if there is a left parenthesis in the object of the verb, it is necessary to store away this verb and its subject to now evaluate this parenthetical phrase, and this is what has just been done. The verb has been stored which was in the Operator Register and the address of its subject which was in the Subject Address Register and placed this in IPDS. The turning on of s.s. 110 has also caused either the "do" or "may do latch" to be set, depending on whether this "evaluate object" subroutine was called either by the add-subtract procedure or the multiply-divide procedure. This is done by sending a signal on line C20 to AND circuit A136. If there is also a signal from the "1" side of latch L8 which is in the multiply-divide procedure then the "do latch" will be set. Also, a signal is set on line C22 to AND circuit A108. If also there is an input from latch L6 which is in the add-subtract procedure, then the "may do latch" will be set. Once either the "do" or "may do latch" is set, AND circuit A126 turns on s.s. 112. This sends a signal to the "not done" inputs of the AND circuits at the calling procedures. Once this is done, s.s. 114 is turned on and control is returned to line C1, and then, after resetting the right parenthesis latch to s.s. 2. If a left parenthesis had not been contained in the IR Decoder, a signal would have been sent through OR circuit O20, through AND circuit A116 and the object address stored in Object Address Register as previously described. Next, s.s. 120 is turned on, and since latch L14 is set, since we are doing "evaluate object" subroutine, AND circuit A118 has an output which then returns control to all the "done" returns in the calling procedures.

The "perform IPDS" subroutine starts at OR circuit O24 and s.s. 126. Turning on s.s. 126 first causes the contents of IPDS to be placed in the Object Register, and then s.s. 128 is turned on. This causes the Object Register character stored at position 3 to be placed in the OR. If there is a $\neq$ in the OR, a signal results from AND circuit A130. This causes the Object Register to be stored in IPDS and also turns on s.s. 132 after this has been done. Turning on s.s. 132 then places a signal on the $\neq$ IPDS return inputs in the calling procedures. If a left parenthesis were in the OR, this turns on s.s. 134 which sends a signal to the "IPDS" return inputs in the calling procedures. If neither a left parenthesis nor a $\neq$ were in OR, which is determined by OR circuit O26, NOT circuit N6 and AND circuit 132 then the address in the Subject Address Registers is gated to the Object Address Register. Then the contents of the fifth and sixth character positions of the Object Register are placed in the Subject Address Register. What is happening here is that the system is now evaluating a new verb and a new subject. Therefore, the old subject is transferred to the Object Address Register and the new subject address is transferred from the Object Register in the fifth and sixth character positions of the Object Register to the Subject Address Register. After this is done, s.s. 142 is turned on. Depending on if an add, subtract, multiply or divide are in the OR, the system performs respectively, the add, substract, multiply or divide. Once these have been done, a signal is placed on the "performed" input in the calling procedures.

There has thus been described in detail the operation of the system as embodied in FIG. 3. All of the specific circuit sequences and subroutines have been set forth. In several instances a particular functional element has not been specifically described or numbered where its operation was obvious and unambigious.

In the previous examples and detailed descriptions keyed in with FIGURES 2 and 3, it will be noted that the examples described necessitated the evaluation by the system of only one parenthetical expression. However, the present system is able to evaluate parentheses within parentheses as disclosed, since each time a left parenthesis "(" is stored, the time proceeds logically through the system until right parenthesis ")" are encountered and each time a right parenthesis is detected, the portion of the instruction stored in the IPDS will be sequentially gated out and performed until a left parenthesis "(" is found. Thus, assuming there were three sets of parenthetical statements, each within the other, three left parentheses "(" operator instruction would be stored in the IPDS and going through such a machine instruction, the first right parenthesis encountered would vided for having an equal precedence to "multiply" and the machine sequence of operations would be such that this middle or interior parenthetical statement would be solved and after solution the system would proceed again through the statement until a second right parenthesis were encountered and then the second parenthetical statement solved, etc., until all three self-contained parenthetical statements were solved. Thus, the flexibility of the present system becomes readily apparent, since with the relatively small amount of control circuitry disclosed very complex mathematical instruction are automatically decoded and sequenced without going through Fortran compilation and assembly routines which are both quite involved and costly in terms of machine time. Similarly, the looped parenthetical instructions or iterative or recursive statements as they are often termed may be stated in terms of the machine language much more simply than even with the Fortran type of statement.

It is further obvious from the teachings of the present invention, that a number of modifications could easily be made to the present instruction sequencing system so that various mathematical symbols and special symbols could be handled by the system.

Other mathematical instructions which might be provided for having an equal precedance to "multiply" and "divide" would be square root, exponent operations, etc., wherein it will be noted that these operators require only a subject. In such case the exponent or $n$th root operator would follow the operand since said operand might well be a parenthetical expression. It will of course be understood that some additional control circuitry would be necessary to recognize and facilitate these additional operations. However, the nature and design of such additional circuitry would be obvious from the present teaching.

An example of other general operations might be sort, merge, truncate, insert delete, AND, OR, NOT, mask, expand, cartesian product and others known to a programmer. Also, other special symbols of the nature of the "until" and "compare" and "transfer" functions, might be if, stop, when, otherwise, etc.

However, it is believed that the particular symbols utilized in the examples and specifically evaluated in the present control circuitry are representative of by far the largest percentage of standard computer instructions as would be normally encountered in a typical machine instruction. While many more complex mathematical problems are obviously solvable by computers, they actually resolve down into very simple machine statements of the type illustrated.

It should also be noted that many changes and modifications could be made in the presently disclosed embodiment of a control circuitry utilizing the teachings of the present invention without departing from the spirit and scope of the invention. For example, the specific logical circuitry could obviously be designed in a great many different ways and the branching of various of the instructions could occur at different places other than those shown with the same results. Similarly, the method of storage of various segments of information in the data word stored in the push-down store could be varied both as the storage position and format. Further, an example of this is that instead of storing both an operand and an operator in a word in IPDS, a separate word could quite conceivably be used for every operand to be stored, every operator and every special symbol. A separate PDS for operands and one for operators could likewise be provided. Also, while the IPDS has been generally referred to as a separate storage element having its own input and output registers, control circuitry, etc., it could also be a part of the Main Memory having a special incrementing and decrementing counter for supplying the specific addresses for this section to obtain the first and last out storage feature necessary for the operation of this system. The manner in which this is done would be obvious to a person skilled in the art as with many large scale computers having large core memories, various sections of the memory are used for separate purposes but utilizing a common control circuitry of the memory.

Similarly, the particular circuit configurations of the various logical functional blocks of the system could assume any of many different forms, for example, the logical circuitry could be embodied in transistor circuitry, conventional tube circuitry, or possibly superconductor circuitry. It is apparent that it is the logical function of the blocks and not the particular design configuration which is of importance in practicing the invention.

There has, thus, been disclosed and described the novel instruction sequencing system for use with an electronic computer which is capable of receiving mathematical problems in the usual mathematical format without necessitating the use of special languages, compilers, assembly programs and the like. The system is completely automatic and self-contained, and supplies all of the information necessary to the Central Process Unit of the computer solving the problem presented in a step by step sequence. The system proceeds through the instruction performing what operations it can in a given step or position in the instruction and stores those portions of the instruction which cannot be performed immediately and proceeds further through the instruction and whenever possible, goes backwards and performs previous instructions which have been temporarily stored. Thus, it is not necessary to completely scan through an instruction before the Central Process Unit of the computer begins performing same. The system is especially well adapted for the solution of complex parenthetical expressions and further provides for a solution of otherwise complicated iterative or recursive expressions which would involve somewhat complex programming with conventional systems.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An automatic instruction sequencing system for use with a digital computer including a main memory and associated controls and a central arithmetic processing unit, said system comprising means for interpreting and ordering an instruction sequence which comprises a first register for storing the address of a first operand, a second register for storing the address of a second operand a third register for storing a current operator associated with said two operands, means for comparing the next operator with the current operator and for determining the relative priority of said operators, means operative in response to the priority determination to selectively perform the operation specified by said current operator; move the contents of both the first operand register and the operator register respectively into a single push-down store and move the contents of the second operand register into the first operand register and place said next operator in the said operator register, means for again comparing the next occurring operator with the operation currently stored in the operator register, and if of lower or equal precedence performing the current operation and subsequent to the performance determining whether the next subsequent operator is of equal or lower precedence than the stored operator and if so, reading the operator and associated operand backout of the push-down store and performing the required operation, further means for detecting a grouped instruction in an instruction sequence and means for performing an entire grouped instruction before any previously stored or subsequent operation may be performed.

2. An automatic instruction sequencing system for use with an electronic computer system including a main memory and its associated controls and a central process unit, said process unit requiring the address of operands together with operator indicators to perform any given arithmetic operation, said system being capable of decoding, evaluating and sequencing the operations specified in a conventional algebraic instruction sequence wherein said sequence is composed of operands, mathematical operators and special operators, said system comprising instruction sequence storage register means, means for sequentially accessing and evaluating the individual elements of the instruction sequence, first operand storage means, second operand storage means, operator storage means, a single push-down store section of memory for temporarily storing portions of the instruction sequence which may not be immediately performed auxiliary register means for accumulating information to be stored in and read out of said push-down store, means for transferring the two operands to the central process unit from the first and second operand storage means and for transferring an operator indication to said central process unit as a result of the operator stored in the operator storage means, control circuit means for said system including means for storing the beginning record mark encountered in an instruction sequence and left grouped instruction sequence indicator said indicators composing parenthesis symbols together with their relative addresses in the instruction sequence first in the auxiliary register means and then in the instruction push-down store when encountered, means for transferring both an operand and its associated operator to said auxiliary register means and then into a single instruction push-down store when encountered, evaluation means for determining if a second operator just succeeding the second operand of a given instruction sequence being evaluated has a precedence greater than the first operator or when a left parenthesis is encountered as a sequence operand, said evaluation means including means for producing a specific output signal upon the occurence of a left parenthesis indicator in the evaluation sequence, means for indicating the precedence level of an operator encountered just prior to the detection of a left parenthesis, means for storing such indication together with the left parenthesis in the instruction push-down store, and means utilizing said indications stored together with said left parenthesis for performing the preceding instruction operation occurring in the sequence in front of the parenthetical expression if the operator subsequent to the parenthetical expression has a precedence level equal to or lower than said stored indication.

3. An automatic instruction sequencing system as set forth in claim 2 wherein the grouped instruction sequence indications are parentheses marks and means are provided in said evaluation means for producing a specific output signal upon the occurrence of a left parenthesis indicator in the evaluation sequence.

4. An automatic instruction sequencing system as set forth in claim 3 including bistable latch means which is set when said first operator being currently evaluated is of the lower of two operator precedence levels said latch being reset if said second operator being currently evaluated is of the same precedence level and the first operator is performed.

5. A system as set forth in claim 4 wherein means are included for indicating the precedence level of an operator encountered just prior to the detection of the left parenthesis and means for storing the indication together with the left parenthesis in the instruction push-down store.

6. An automatic instruction sequencing system as set forth in claim 5 wherein said last named means includes two bistable latch means either of which is set depending upon whether the operator just preceding the parenthetical expression has a first or second level of precedence and further including means for storing an indication of the condition of these latches with the left parenthesis operator in both the auxiliary storage means and the instruction push-down store.

7. An automatic instruction sequencing system as set forth in claim 6 including means utilizing said indication stored together with said left parenthesis for performing the preceding instruction operation occurring in the sequence in front of the parenthetical expression if the operator subsequent to the parenthetical expression has a precedence level equal to or lower than said stored indication.

8. An automatic instruction sequencing system as set forth in claim 2 including means for automatically performing conditional instructions where the repetitive performance of a stated instruction is required until the condition is satisfied and wherein the condition to be satisfied is always a parenthetical statement, said means including means for detecting a special conditional operator, means for retrieving the portion of the instruction sequence which is to be repeated, means for checking the fulfillment of the condition and means for automatically returning to the point in the instruction sequence where the conditional instruction began and going through the remainder of the instruction from this point and means for repeating this procedure until the condition is satisfied.

9. An automatic instruction sequencing system as set forth in claim 8 wherein the means for retrieving the portion of the instruction sequence which is to be repeated includes three bistable latch circuit means wherein only one may be set at any one time, the setting of a first of said latches being accomplished when a parenthetical expression is a simple operand, a second of said latches being set when a left parenthesis immediately follows the special conditional operator and the operand immediately preceding the special conditional operator is a parenthetical expression, the third of said latches being set when the statement preceding the conditional operator is not a parenthetical expression wherein, upon an unsuccessful comparison, when the second latch is set the system control will return to the preceding left parenthesis and repeat the indicated instruction and when the third latch is set control will return to the beginning of the instruction.

10. An automatic instruction sequencing system as set forth in claim 9 wherein the instruction sequence address of the subject of the conditional statement is maintained by the system by retaining same in said auxiliary register until it is determined whether a special conditional operator follows the parenthetical statement and if so means are provided to set said second latch and store an indication of all of the latches in predetermined position in the auxiliary register together with the previously stored left parenthesis operator and its sequence address and return the contents of the auxiliary register to the instruction push-down store until the indicated comparison is completed.

References Cited by the Examiner
UNITED STATES PATENTS 3,047,228  7/1962  Bauer _____ 235—157

ROBERT C. BAILEY, *Primary Examiner.*

R. B. ZACHE, *Assistant Examiner.*